(12) United States Patent
Wei et al.

(10) Patent No.: US 12,375,994 B2
(45) Date of Patent: Jul. 29, 2025

(54) COMMUNICATIONS DEVICE, INFRASTRUCTURE EQUIPMENT AND METHODS FOR PERFORMING HANDOVER USING A MODEL BASED ON MACHINE LEARNING

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 367 days.

(21) Appl. No.: 17/778,885

(22) PCT Filed: Dec. 18, 2020

(86) PCT No.: PCT/EP2020/087190
§ 371 (c)(1),
(2) Date: May 23, 2022

(87) PCT Pub. No.: WO2021/123285
PCT Pub. Date: Jun. 24, 2021

(65) Prior Publication Data
US 2023/0354121 A1 Nov. 2, 2023

(30) Foreign Application Priority Data
Dec. 20, 2019 (EP) .................................... 19218564

(51) Int. Cl.
*H04W 36/08* (2009.01)
*H04W 36/36* (2009.01)
(Continued)

(52) U.S. Cl.
CPC .... *H04W 36/362* (2023.05); *H04W 36/00835* (2018.08); *H04W 36/008375* (2023.05);
(Continued)

(58) Field of Classification Search
CPC ......... H04W 36/362; H04W 36/00835; H04W 36/008375; H04W 36/00838;
(Continued)

(56) References Cited

U.S. PATENT DOCUMENTS

| 2009/0023448 A1* | 1/2009 | Attar ................. | H04W 36/0061 455/436 |
| 2015/0036663 A1* | 2/2015 | Kilpatrick, II .... | H04W 36/0085 370/332 |

(Continued)

FOREIGN PATENT DOCUMENTS

| WO | 2019/172813 A1 | 9/2019 |
| WO | 2019/228614 A1 | 12/2019 |

OTHER PUBLICATIONS

International Search Report and Written Opinion mailed on May 18, 2021, received for PCT Application PCT/EP2020/087190, Filed on Dec. 18, 2020, 23 pages.
(Continued)

*Primary Examiner* — Eunsook Choi
(74) *Attorney, Agent, or Firm* — XSENSUS, LLP

(57) ABSTRACT

A method of transmitting or receiving data by a communications device in a wireless communications network, the method comprising: establishing a connection for transmitting or receiving the data in a first cell of the wireless communications network, determining a value of one or more input parameters, using the value of the one or more input parameters as inputs to a model trained using machine learning, determining, based on an output of the model, that the communications device should perform a handover to
(Continued)

establish a connection in a second cell, and responsive to determining that the communications device should establish a connection in the second cell, transmitting a handover message to request the establishment of a connection in a second cell.

19 Claims, 10 Drawing Sheets

(51) Int. Cl.
H04W 36/00 (2009.01)
H04W 36/30 (2009.01)
H04W 36/32 (2009.01)

(52) U.S. Cl.
CPC ...... *H04W 36/00838* (2023.05); *H04W 36/08* (2013.01); *H04W 36/302* (2023.05); *H04W 36/322* (2023.05)

(58) Field of Classification Search
CPC . H04W 36/08; H04W 36/302; H04W 36/322; H04W 36/38; H04W 88/02; H04W 88/08
See application file for complete search history.

(56) References Cited

U.S. PATENT DOCUMENTS

| | | | |
|---|---|---|---|
| 2015/0133121 A1* | 5/2015 | Li ..................... | H04W 36/0058 455/436 |
| 2015/0141019 A1* | 5/2015 | Bengtsson .......... | H04W 36/322 455/440 |
| 2018/0234900 A1* | 8/2018 | Sankaranarayan ... | H04W 48/16 |
| 2020/0296641 A1 | 9/2020 | Song et al. | |
| 2022/0141751 A1* | 5/2022 | Yao ...................... | H04W 24/08 370/331 |

OTHER PUBLICATIONS

Holma et al., "LTE for UMTS OFDMA and SC-FDMA Based Radio Access", John Wiley & Sons, 2009, pp. 1-433.

Dalman et al., "5G NR: The Next Generation Wireless Access Technology", Science Direct, Aug. 9, 2018, 5 pages.

3Gpp, "NR; NR and NG-RAN Overall Description; Stage 2 (Release 15)", 3GPP TS 38.300 V15.2.0, Jun. 2018, pp. 1-87.

\* cited by examiner

COMMUNICATIONS DEVICE, INFRASTRUCTURE EQUIPMENT AND METHODS FOR PERFORMING HANDOVER USING A MODEL BASED ON MACHINE LEARNING

CROSS-REFERENCE TO RELATED APPLICATIONS

The present application is based on PCT filing PCT/EP2020/087190, filed Dec. 18, 2020, which claims priority to EP 19218564.3, filed Dec. 20, 2019, the entire contents of each are incorporated herein by reference.

BACKGROUND

Field

The present disclosure relates to communications devices, infrastructure equipment and methods for the transmission and reception of data in a wireless communications network and for the generation and use of a model for determining when a cell change should occur.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new Radio Access Technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method of transmitting or receiving data by a communications device in a wireless communications network, the method comprising: establishing a connection for transmitting or receiving the data in a first cell of the wireless communications network, determining a value of one or more input parameters, using the value of the one or more input parameters as inputs to a model trained using machine learning, determining, based on an output of the model, that the communications device should perform a handover to establish a connection in a second cell, and responsive to determining that the communications device should establish a connection in the second cell, transmitting a handover message to request the establishment of a connection in a second cell.

Embodiments of the present technique can provide a handover determination using a machine learning technique to determine whether a communications device should perform a handover from a current serving cell to a different cell, based on measured or determined values of one or more input parameters.

Thus based on the value of each of the one or more input parameters a machine learning or artificial intelligence circuit applies a trained configuration to initiate a handover dynamically in accordance with, for example, currently experienced radio conditions. Accordingly the ability for a communications device to maintain (or minimize any degradation of) the ability to transmit and receive data while moving is improved by using a machine learning technique.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Figure 1:
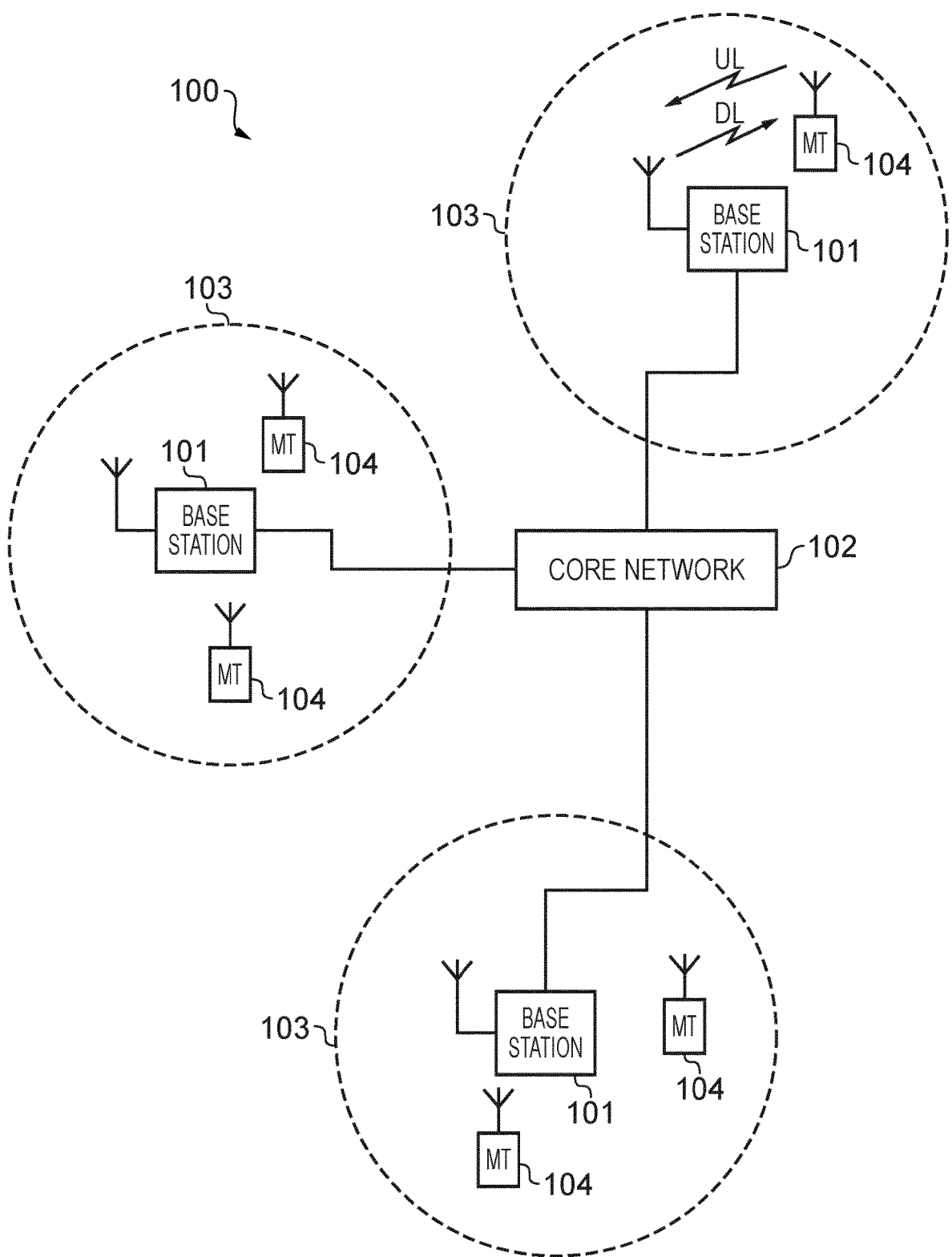
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
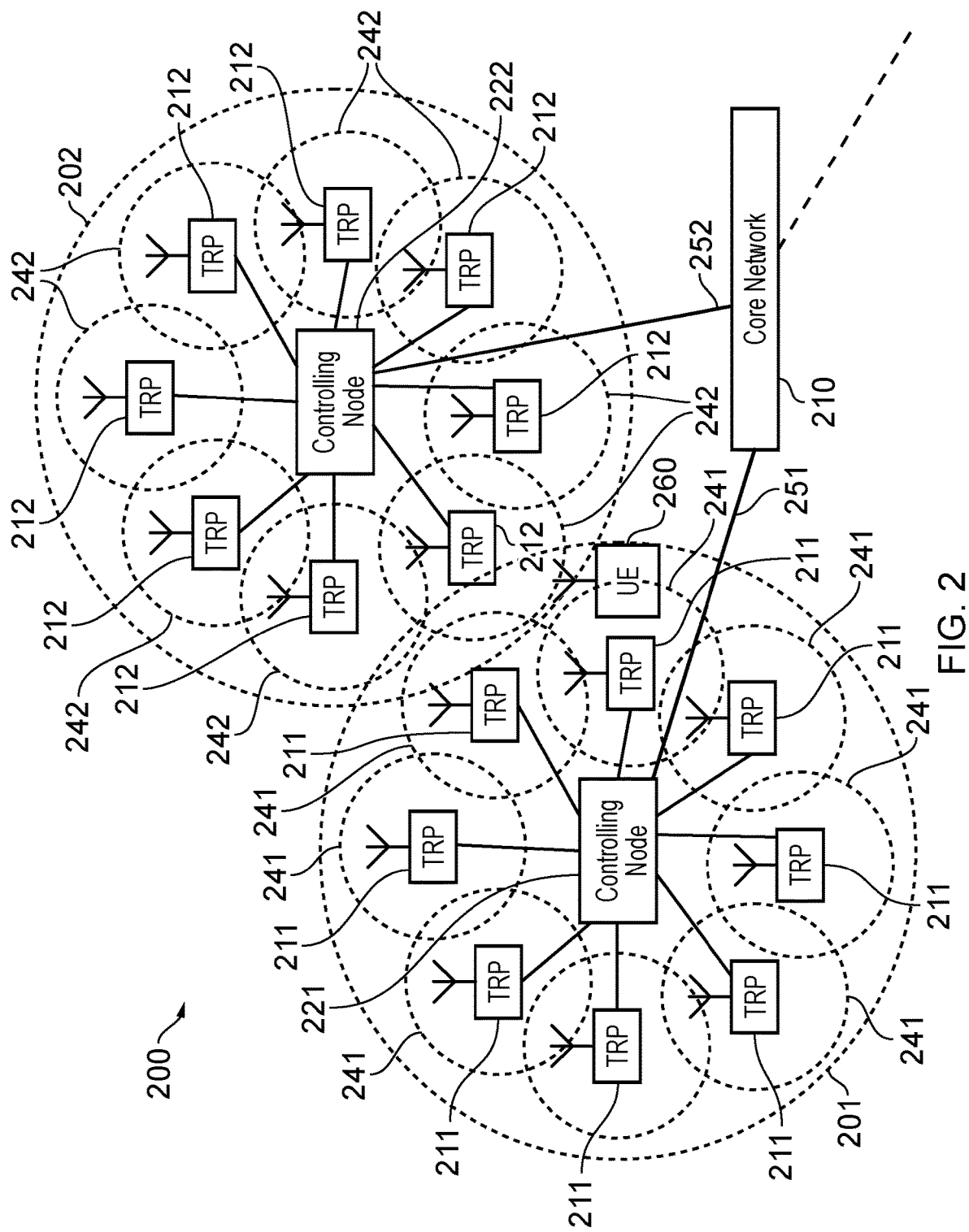
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communications cell 201 and a second communications cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communications cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communications cell 201. This communications device 260 may thus exchange signalling with the first controlling node 221 in the first communications cell via one of the distributed units 211 associated with the first communications cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communications cells 201, 202 and one communications device 260 are shown for simplicity, but it will of course be appreciated that in practice the system may comprise a larger number of communications cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
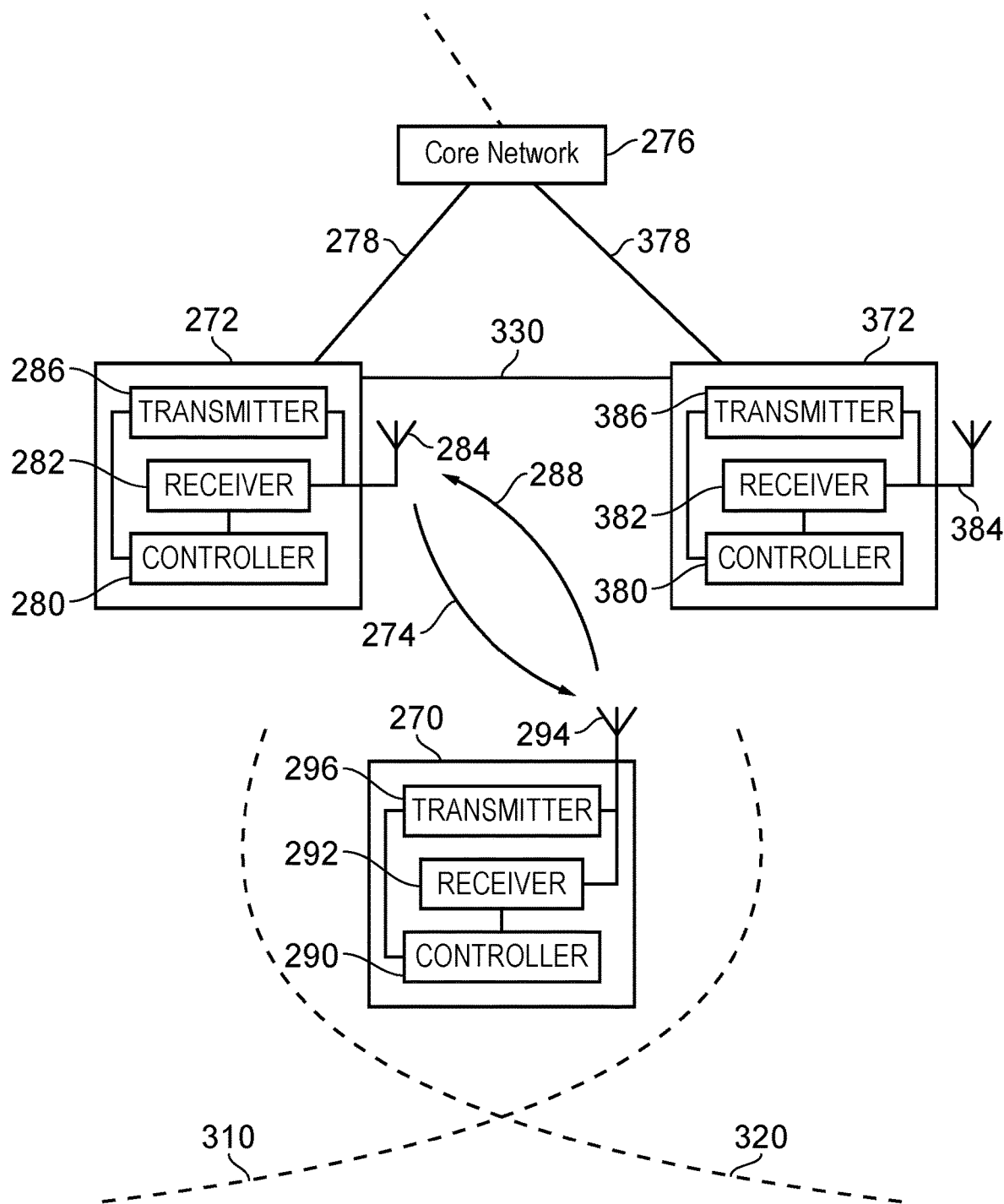
FIG. 3 is a schematic block diagram of example infrastructure equipment and communications device which may be configured in accordance with certain embodiments.

FIG. 3 illustrates schematically a UE/communications device 270 and example first and second network infrastructure equipment 272, 372. The communications device 270 may be thought of as an example of the communications device 104 of FIG. 1 or of the UE 260 of FIG. 2. Each of the first and second infrastructure equipment 272, 372, may be thought of as a gNB 101 or a combination of a controlling node 221 and TRP 211. Controllers 280, 380 of the infrastructure equipment 272, 372 are connected to a core network part 276 via respective interfaces 278, 378.

The first infrastructure equipment 272 includes a receiver 282 connected to an antenna 284 and a transmitter 286 connected to the antenna 284. Similarly, the second infrastructure equipment 372 includes a receiver 382 connected to an antenna 384 and a transmitter 386 connected to the antenna 384.

Correspondingly, the UE 270 includes a controller 290 connected to a receiver 292 which receives signals from an antenna 294 and a transmitter 296 also connected to the antenna 294.

The controllers 280, 380 are configured to control the first and second infrastructure equipment 272, 372 respectively and may comprise processor circuitry which may in turn comprise various sub-units/sub-circuits for providing functionality as explained further herein. These sub-units may be implemented as discrete hardware elements or as appropriately configured functions of the processor circuitry. Thus the controllers 280, 380 may comprise circuitry which is suitably configured/programmed to provide the desired functionality using conventional programming/configuration techniques for equipment in wireless telecommunications systems. The transmitters 286, 386 and the receivers 282, 382 may comprise signal processing and radio frequency filters, amplifiers and circuitry in accordance with conventional arrangements. The transmitters 286, 386, the receivers 282, 382 and the controllers 280, 380 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272, 372 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 380, 290 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

The first and second infrastructure equipment 272, 372 are connected directly to each other via an inter-infrastructure equipment interface 330, which, for example, may be operated broadly in accordance with conventional specifications for an X2 or Xn interface as specified by 3GPP.

The first infrastructure equipment 272 controls a first cell 310 in which the communications device 270 receives downlink data from the first infrastructure equipment 272 via resources of a wireless access interface as illustrated generally by an arrow 274, and transmits uplink data to the first infrastructure equipment 272 via resources of the wireless access interface as illustrated generally by an arrow 288.

The second infrastructure equipment 372 controls a second cell 320.

Conventional Network-Controlled Handover

Figure 4:
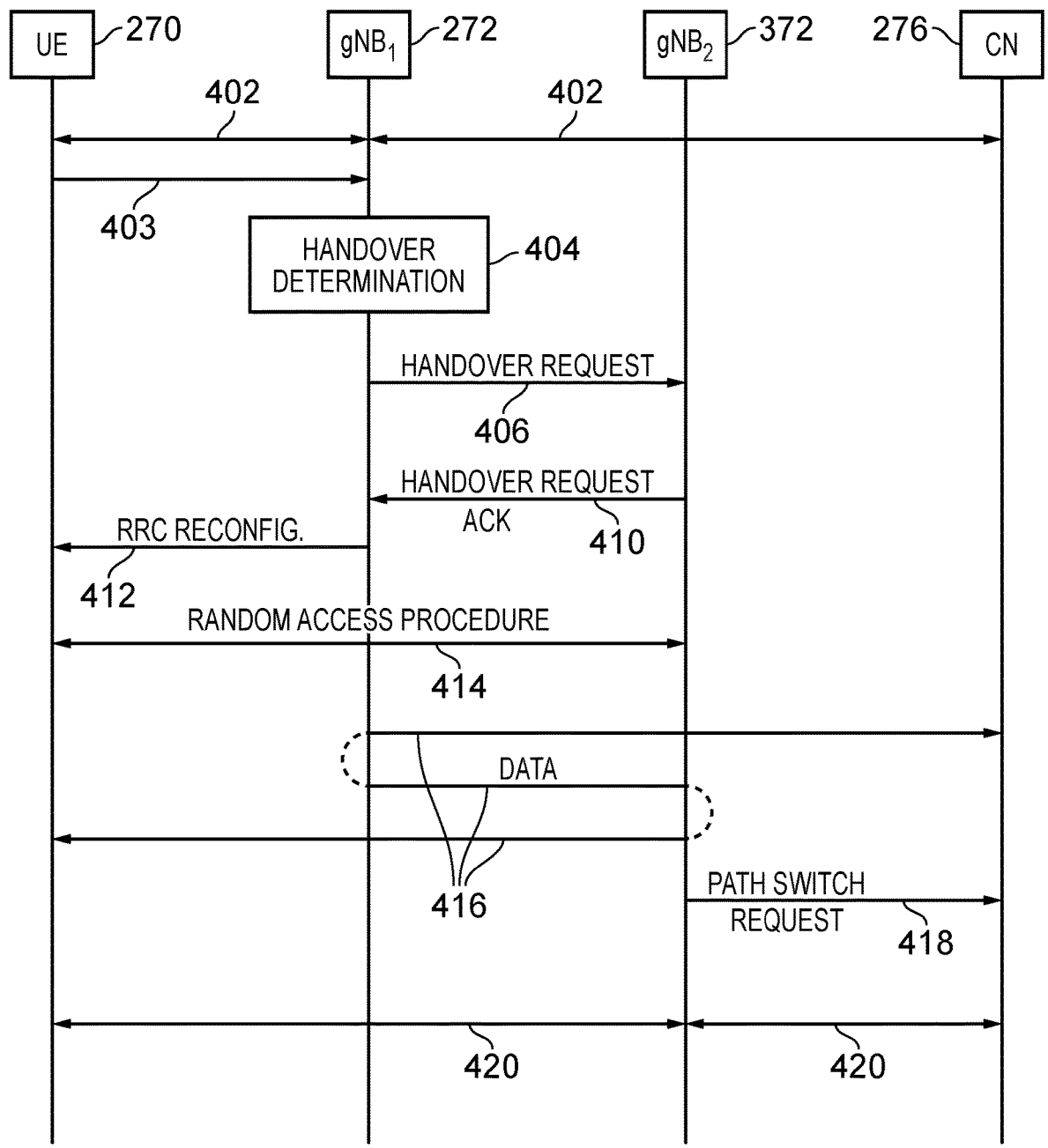
FIG. 4 is a combined message sequence chart and process flow diagram representing aspects of a conventional handover.

Aspects of a conventional handover process are illustrated in FIG. 4.

Initially, the communications device 270 is being served in the first cell 310 associated with the first infrastructure equipment 272 acting as a source infrastructure equipment. The communications device 270 has an RRC connection in the first cell 310 with the first infrastructure equipment 272. Data 402 is transmitted to or from the core network 276 from or to the communications device 270, via the source infrastructure equipment 272.

The source infrastructure equipment 272 determines in process 404 that the communications device 270 should, in future, be served in a different cell. This determination may be based on measurements on signals transmitted by the communications device 270 and received at the first infrastructure equipment 272 (not shown in FIG. 4), and/or based on measurement reports transmitted by the communications device 270, such as measurement report 403. The measurement reports 403 may comprise indications of the results of measurements performed by the communications device 270 on signals transmitted by the first infrastructure equipment 272, and/or of measurements performed by the communications device 270 on signals transmitted by the other infrastructure equipment, such as the second infrastructure equipment 372.

In response to the determination 404, the source infrastructure equipment 272 selects a candidate cell. This selection may be based on the measurement reports transmitted by the communications device 270. In the example of FIG. 4, the source infrastructure equipment 272 selects the second cell 320, associated with the second infrastructure equipment 372.

Accordingly, the source infrastructure equipment 272 may initiate a handover procedure with the target infrastructure equipment 372. In the example of FIG. 4, the source infrastructure equipment 272 and the target infrastructure equipment 372 are directly connected (such as by an X2 or Xn inter-infrastructure equipment connection), however in some examples, the handover procedure may comprise signalling transmitted via, but not involving, the core network 276. The handover preparation may thus occur without specific interaction with the core network 276.

As part of the handover preparation, the source infrastructure equipment 272 transmits a handover request 406 to the target infrastructure equipment 372 to allocate communications resources in the new cell for the communications device 270. In response, the target infrastructure equipment 372 transmits to the source infrastructure equipment 272 a handover request acknowledge message 410, containing parameters for the use of the communications device 270 in the new cell. The parameters may include communications resources, identity, and configuration parameters to be used by the communications device 270 in the target (second) cell 320. The parameters are forwarded to the communications device 270, in an RRC reconfiguration message 412.

In response to receiving the RRC reconfiguration message 412, the communications device 270 accesses the new cell, for example using a random access procedure 414.

In the example of FIG. 4, at this stage, entities in the core network 276 are not aware that the serving cell of the communications device 270 has changed, and data 416 received from the core network 276 for onward transmission to the communications device 270 by the source infrastructure continues to be forwarded to the source infrastructure equipment 272.

In order to notify the core network 276 of the change of serving cell (and, more particularly, of serving infrastructure equipment), the target infrastructure equipment 372 may send a Path Switch Request message 418 to the core network 276, in response to which, the core network 276 subsequently transmits data 420 for the communications device 270 to the target infrastructure equipment 372 instead of the source infrastructure equipment 272.

As will be understood from the preceding description, in a conventional wireless telecommunication network, handover decisions are made solely by entities within the RAN/core network (e.g. controlling nodes, base stations, infrastructure equipment), and not by communications devices themselves. As discussed in respect of the process of FIG. 4, the source infrastructure equipment 272 associated with the current active cell (i.e. the first cell 310), having determined that the communications device 270 should be handed over to the second cell 320, informs the communications device 270 that it is being handed over to the second cell 320.

Accordingly, the involvement of the communications device 270 in the procedure is limited to transmitting/receiving signalling associated with making measurements which support the decision, taken by an entity within the RAN/core network (e.g. the source infrastructure equipment 272), about the most suitable target cell for the handover. The source infrastructure equipment 272, having configured the target infrastructure equipment 372 for the handover to the second cell 320, informs the communications device 270 of the handover, provides any necessary configuration information for the communications device 270 to access the second cell 320, and then instructs the communications device 270 to perform the handover.

The geographic range of a particular cell may be limited by signal propagation from the transmitting antenna (either for the uplink or downlink) or capacity (where high communications resource re-use is required to permit many devices to communicate in accordance with their respective quality of service needs), or for any other reasons.

Devices which are mobile thus need to ensure that they are connected to the most appropriate cell, even if they are moving.

Cell change while in connected mode (i.e. handover) is a critical feature in wireless communications networks: a handover which occurs too early, or too late (or not at all), or to a wrong target cell can result in a temporary loss of connectivity, resulting in dropped or delayed data transmissions.

Existing handover techniques in which the handover decision is made solely by infrastructure equipment can require significant signalling between the communications device and infrastructure equipment of the wireless communications network. This may in particular include signalling which is very close in time to the desired handover time, when the signal strength or quality in the serving cell may be deteriorating rapidly.

Furthermore, the need for the infrastructure equipment to obtain measurement reports from the communications device in order to make the handover decision can delay the handover.

There is thus a need to provide an improved handover technique, and in particular to provide a handover technique which can avoid or reduce the signalling requirements of conventional techniques.

Embodiments of the present technique can provide a method of transmitting or receiving data by a communications device in a wireless communications network, the method comprising: establishing a connection for transmitting or receiving the data in a first cell of the wireless communications network, determining a value of one or more input parameters, using the value of the one or more input parameters as inputs to a model trained using machine learning, determining, based on an output of the model, that the communications device should perform a handover to establish a connection in a second cell, and responsive to determining that the communications device should establish a connection in the second cell, transmitting a handover message to request the establishment of a connection in a second cell.

Embodiments of the present technique can therefore result in improved handover performance with lower likelihood of incorrect handover decisions which may lead to degradation or loss of the ability of the communications device to transmit and receive data in the wireless communications network while in motion.

Figure 5:
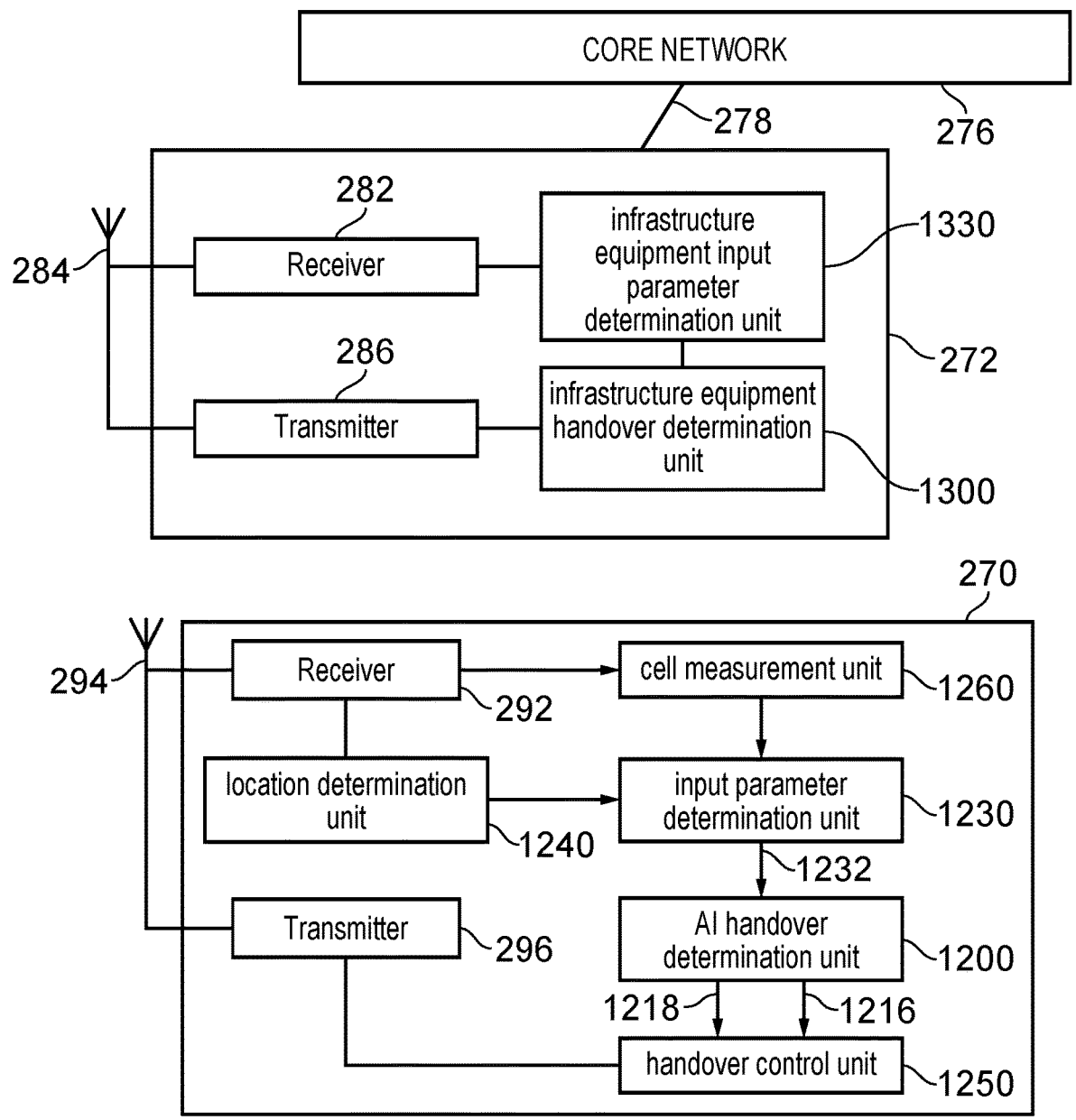
FIG. 5 illustrates a block diagram showing a communications device and infrastructure equipment adapted in accordance with example embodiments of the present technique.

FIG. 5 illustrates a block diagram showing functional entities within a communications device such as the communications device 270 and infrastructure equipment (such as the first infrastructure equipment 272) adapted in accordance with example embodiments of the present technique.

The communications device 270 comprises an artificial intelligence (AI) handover determination unit 1200. The communications device 270 also comprises an input parameter determination unit 1230 and a handover control unit 1250.

In the example of FIG. 5, the input parameter values determined by the input parameter determination unit 1230 and used by the AI handover determination unit 1200 may comprise location parameters determined by a location determination unit 1240 and measurement parameters determined by a cell measurement unit 1260. Accordingly, the location determination unit 1240 and the cell measurement unit 1260 may obtain information from the receiver 292 for determining the location and cell measurements respectively.

In the example of FIG. 5, the infrastructure equipment 272 also comprises an infrastructure equipment handover determination unit 1300 and an infrastructure equipment input parameter determination unit 1330. In some embodiments, the infrastructure equipment 272 may additionally comprise units (not shown in FIG. 5) for determining individual parameters, such as location parameters, measurement values, and the like. The AI handover determination unit 1200, the input parameter determination unit 1230, the handover control unit 1250, the cell measurement unit 1260 and the location determination unit 1240 in the communications device 270 may be implemented by the controller 290 of the communications device 270. Similarly, the infrastructure equipment handover determination unit 1300 and the infrastructure equipment input parameter determination unit 1330 in the infrastructure equipment 272, 372 may be implemented by the respective controllers 280, 380 of the infrastructure equipment 272, 372.

When the communications device 270 is in a connected mode (e.g. has an RRC connection established with the infrastructure equipment 272), the AI handover determination unit 1200 determines whether a handover should occur. The determination is based on the value of one or more input parameters determined by the input parameter determination unit 1230, as will further be described below.

If the AI handover determination unit 1200 determines that a handover should occur, a handover signal 1216 is sent from the AI handover determination unit 1200 to the handover control function 1250. If the AI handover determination unit 1200 determines that a handover should occur, a selected target cell indication 1218 may also be sent from the AI handover determination unit 1200 to the handover control function 1250. In response to receiving the handover signal, the handover control unit 1250 may initiate a handover procedure, as will be described further below.

The determination by the AI handover determination unit 1200 may occur periodically, or in response to receiving new input parameter values from the input parameter determination unit 1230, or both.

The values of the input parameters are determined by the input parameter determination unit 1230, which may operate in cooperation with one or more other functional or logical units to determine the value of the input parameters. The values of the input parameters may be passed in an input parameter value indication 1232 from the input parameter determination unit 1230 to the AI handover determination unit 1200.

Input Parameters

Examples of various input parameters will now be described.

In some embodiments, a measurement result associated with a cell is used as an input parameter. The measurement result may comprise an indication of the result(s) of one or more measurements of signals received on the wireless access interface by the communications device 270, and may for example comprise one or more of received signal power measurements, received signal quality measurements, error rates after decoding (e.g. block error rates), and the like.

The measurement results may be in respect of the current serving cell and/or one or more candidate target cells and may be based on, for example, pilot or reference signal transmissions on broadcast channels.

The measurement results may further or alternatively comprise an indication of a trend of a measurement, for example, a rate of change of an increase (or decrease) in signal power measurements associated with signals transmitted in a particular cell and received at the communications device 270. Measurement results may be stored, and based on the stored history of measurement results, a measurement changing trend which can be an input parameter can be deduced.

In some embodiments, the input parameters may comprise an indication of service requirements associated with data being transmitted by or to the communications device 270. The indication of the service requirements associated with the data may comprise an indication of reliability requirements (e.g. probability of successful transmission), latency requirements (e.g. maximum permitted delay within the access stratum protocol layers) and/or other quality of service requirements associated with the data.

In some embodiments a current location of the communications device 270 may be an input parameter. This parameter may indicate an absolute location (e.g. based on satellite-based location determination). In some embodiments, the location indication may be relative to the current serving cell 310, or other geographical regions defined with respect to the coverage regions of the wireless communications network.

In some embodiments, the location may be determined based on a current serving beam (or beam direction).

In some embodiments a mobility status of the communications device 270 may be an input parameter. For example, the mobility status parameter may indicate a speed and/or direction of the communications device 270. The parameter may reflect historical data (e.g. direction and speed of movement prior to the time of generation of the input parameter value) or may be based on a predicted future trajectory of the communications device 270. The predicted trajectory may be based on a pre-determined trajectory applicable to the communications device 270. The pre-determined trajectory may be provided by an application layer, for example from a navigation application. In some embodiments, the communications device 270 may be incorporated within a unmanned aerial vehicle (e.g. a drone) and the determined trajectory may correspond to a pre-defined delivery route of the UAV. In some embodiments, the pre-determined trajectory may be determined based on collected historical mobility data for the communications device and/or for a user of the communications device, such as mobility data which reflects daily routine information e.g. driving route commuting from home to office.

The mobility status parameter may further indicate whether the mobility status of the communications device 270 is highly predictable (e.g. because it has been following a particular trajectory consistently in the immediate past) or is less predictable (e.g. because it has changed direction and/or changed from mobile to stationary repeatedly in the immediate past).

Additionally or alternatively, an input parameter may indicate a mobility rate of the communications device 270, such as a number of cell (or sub-cell region, as described below) changes within a predetermined time period, or a duration of stay in the current cell or sub-cell region.

The mobility status parameter may indicate whether or not the communications device 270 is moving at a high speed (e.g. at or above a vehicular speed) with respect to the infrastructure equipment 272, and/or whether or not the communications device 270 is moving at all (e.g. is not fixed in a particular location).

One or more input parameters may be based on analysis of historical behaviour of the communications device 270, such as based on a time and location history of the communications device. For example, it may be determined that during the morning rush hour on certain days of the week, the communications device 270 follows, with high probability, a route from a first location to a second location, the first and second locations being the same, but the route varying. Thus, an input parameter may reflect that if the current time is during the morning rush hour and it is one of the certain days of the week, the communications device 270 is likely to be on a route from the first location to the second location. The analysis may further reveal patterns of the communications device 270 being stationary, being mobile within a local region (e.g. because a user is at an outdoor activity), or having no predictable behaviour at certain times of the week. Such patterns may be used as input parameters.

An input parameter may indicate time and/or date or some category associated with the current time and date (e.g. morning weekday rush-hour).

A further input parameter may indicate a current and/or expected weather situation in the serving cell (e.g. temperature, precipitation rate).

Other input parameters may indicate one or more aspects associated with a user profile of the communications device 270, such as their age, frequently used applications or websites and the like. Other input parameters may indicate one or more aspects associated with the nature of the communications device 270 such as whether or not it is a smartphone, whether it is a machine type communications device (i.e. one which transmits and receives predominantly independently of human interaction, such as a smart meter, remote equipment monitor, sensor, etc.) Yet another input parameter may indicate a current transmission power level used by the communications device 270 for transmissions in the serving cell 310.

As discussed above, in some embodiments, an input parameter may indicate a location of the communications device 270, or a mobility pattern (either past/present or predicted). The indication of the location or path of the communications device 270 may be absolute (e.g. based on latitude/longitude), relative to the coverage area of the current serving cell (e.g. at an edge of a current serving cell or close to a centre of the serving cell), or may be at cell level (e.g. an identity of a particular cell). In some embodiments, the indication of the location (or past/present/future mobility) of the communications device 270 may comprise an indication of one or more sub-cell regions as will be described in further detail below.

In some embodiments, a location or path may be represented by a parameter in terms which are defined based on the coverage (or portions thereof) of a cell. For example, a location (which may form part of a path) may be represented by a particular beam or beam direction formed by infrastructure equipment of the wireless communications network.

An indication of a path or of recent mobility may comprise a sequence of locations, each of which may be expressed using the same technique, or may use different techniques (for example, for locations in a path which relate to time periods close to the present may be represented more accurately, for example at a sub-cell region level), while long past or far future locations may be represented at a cell level.

The value of one or more of the input parameters may be determined by the input parameter determination unit 1230 of the communications device 270 by receiving an indication of the value of one or more input parameter from the infrastructure equipment 272. For example, an indication of the radio conditions applicable to transmissions by the communications device 270 on the wireless access interface may comprise a measurement report sent by the infrastructure equipment 272 which is based on a result of a measurement of signals transmitted by the communications device 270 on the wireless access interface and received at the infrastructure equipment 272. Accordingly, the input parameter determination unit 1230 may receive (for example, from a radio resource control entity of the communications device 270, not shown in FIG. 5) the indication of the radio conditions.

The value of one or more of the input parameters may be determined by receiving an indication of the value of the input parameter from another entity, such as from the core network 276. For example, an indication of service requirements associated with the data may be received as part of non access stratum (NAS) signalling. Accordingly, the input parameter determination unit 1230 may receive (for example, from a NAS entity of the communications device 270) the indication of the service requirements.

Based on the value(s) of the input parameter(s) indicated by the input parameter value indication 1232 passed from the input parameter determination unit 1230 to the AI handover determination unit 1200, the AI handover determination unit 1200 determines whether a handover should occur.

The AI handover determination unit 1200 may operate in accordance with artificial intelligence/machine learning techniques. That is, for example, the AI handover determination unit 1200 may operate based on a model derived in accordance with machine learning techniques as will be described below.

It will be appreciated that the use of machine learning can result in improved decision-making performance, by exploiting underlying correlations between the input parameter values and a desired output, even if those underlying correlations are complex and multi-variable. Accordingly, embodiments of the present technique can provide a better handover decision process, and correspondingly, can result in handovers which avoid service interruption, have higher likelihood of success, and minimize degradation to the ability of the communications device 270 to transmit and receive data while moving.

The model is used within the AI handover determination unit 1200 (or elsewhere, as described herein) to generate an output based on the input parameter values. The output may comprise an indication of a single target cell. In some embodiments, the output may comprise an indication of one or more candidate cells and an indication of respective associated priorities and/or respective associated probabilities. The associated priorities may correspond to a ranking of the cells, such that a cell with higher ranking is to be preferred for selection as a target cell. The associated probability/probabilities may indicate an estimated probability of handover success to the associated target cell.

As described below, the model may be generated based on machine learning. In some embodiments, the model may further use statistics from historical handovers, for example corresponding to historical handover success probabilities from different locations within a serving cell, in order to generate, for example, the probabilities associated with one or more candidate cells.

Based on the output, a determination is made as to whether a handover should be performed, and in some embodiments, which of a plurality of candidate cells should be the target cell in which a connection is to be established following (or as part of) the handover procedure.

In some embodiments (as shown, for example, in FIG. 5), the communications device 270 may determine using the model that a handover should be initiated and may further determine one or more feasible candidate target cells to which the handover should take place. The one or more feasible candidate target cells may be those which are associated with a high priority and/or with a high estimated probability of handover success.

In some embodiments, the model is implemented additionally or alternatively within one or more other entities (e.g. the infrastructure equipment 272, 372).

In some embodiments, some or all of the output from the model in one entity (such as in the communications device 270) is transmitted to another entity, and the handover decision is thus made within a different entity from that in which the model is used to generate its output.

In some embodiments of the present technique, the communications device 270 (or other entity) may receive a representation of the model, which is stored in memory (not shown) of the communications device 270. Preferably, the memory is non-volatile memory. In some embodiments, the model is provisioned within the communications device 270 prior to sale to an end user and before operation. In some embodiments, the model of the communications device 270 is updated, for example by means of an over-the-air (OTA) update.

The provisioning may be part of the manufacturing process (e.g. by programming non-volatile memory of the communications device 270 with the representation) or may be by means of data transfer (either via a wireless access interface or by a wired connection) before or after manufacture.

In the example of FIG. 5, based on the received handover signal 1216 (and optionally the selected target cell indication 1218), the handover control function 1250 initiates a handover.

Handover Procedure

In accordance with conventional techniques, a handover decision is made by the infrastructure equipment associated with the serving cell. The decision may be based on measurement reports transmitted by the communications device, reporting measurements of signals transmitted in the serving cell and/or one or more target cells.

In accordance with embodiments of the present technique, as described above, the decision to initiate a handover is made at the communications device 270, based on a model trained using machine learning techniques.

In accordance with some embodiments of the present technique, the communications device 270, in response to determining that a handover should occur, transmits a handover message to the infrastructure equipment 272 associated with the serving cell. The handover message may comprise an indication of the target cell to which the handover should occur.

Figure 6:
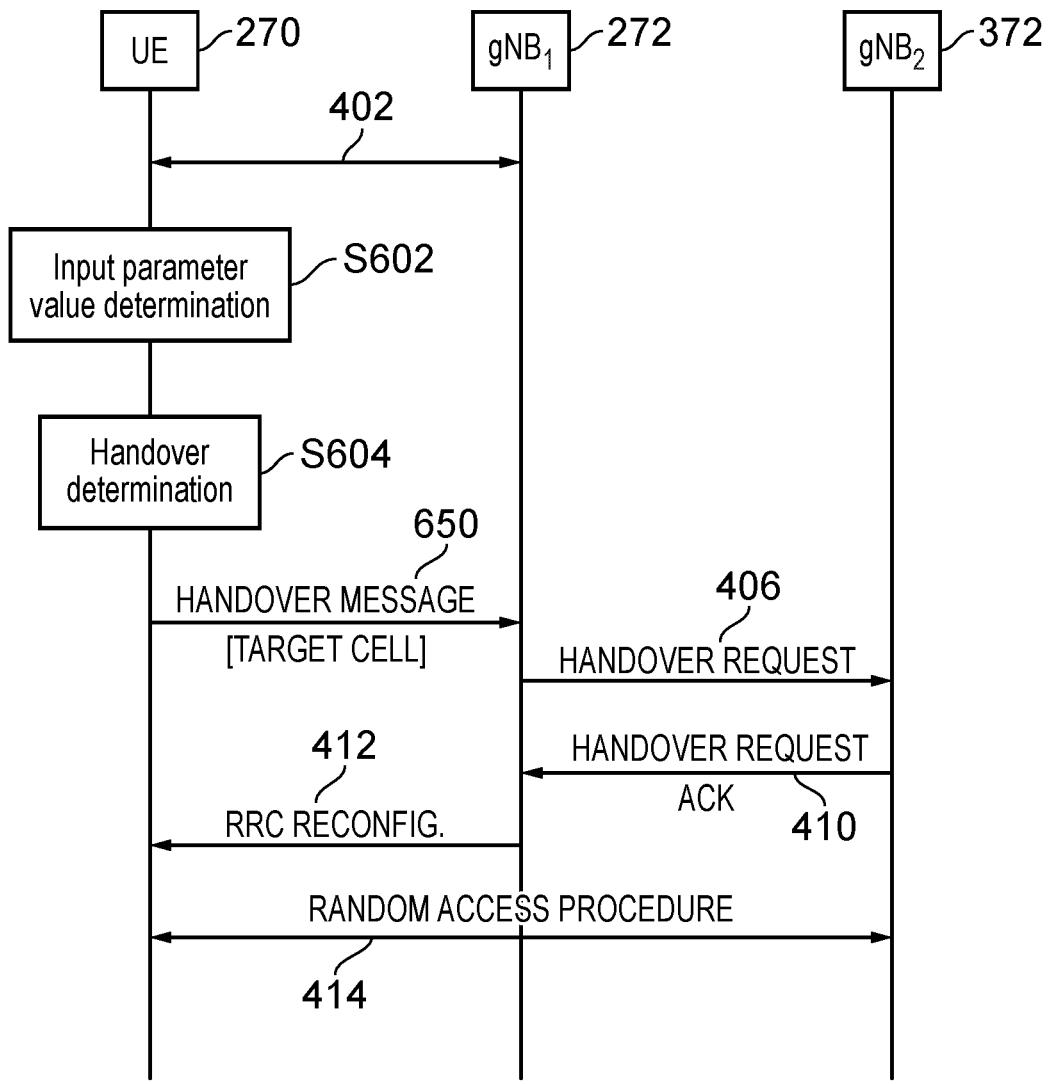
FIG. 6 illustrates a combined process flow diagram and message sequence chart for a handover in accordance with embodiments of the present technique.

FIG. 6 illustrates a combined process flow diagram and message sequence chart for a handover in accordance with embodiments of the present technique. Messages which broadly correspond to those used in the process shown in FIG. 4 and described above are indicated with like reference numerals and their description is omitted here for conciseness. Similarly, interactions with the core network 276 are omitted for clarity and conciseness, though it will be appreciated that messages between the infrastructure equipment 272, 372 and the core network 276 may be broadly in accordance with conventional techniques.

At step S602, the input parameter determination unit 1230 of the communications device 270 determines the input parameter values required by the model for determining whether a handover should occur.

At step S604, the AI handover determination unit 1200 of the communications device 270 uses the determined input parameter values and the model to determine whether a handover should be initiated.

If it is determined that a handover should be initiated, then the handover signal 1216 (see FIG. 5) is sent from the AI handover determination unit 1200 to the handover control function 1250 to trigger a handover message 650 to be transmitted from the communications device 270 to the serving infrastructure equipment 272 in the first cell 310. If the communications device 270 determined at step S604 (or otherwise) the target cell, then, as shown in FIG. 5, the selected target cell indication 1218 may also be sent from the AI handover determination unit 1200 to the handover control function 1250 and accordingly an indication of the target cell may be included in the handover message 650.

In response to receiving the handover message 650, if the handover message 650 did not include an indication of the target cell, then the serving infrastructure equipment 272 determines the target cell using any appropriate technique.

The serving infrastructure equipment 272 continues with a conventional handover procedure by transmitting the handover request message 406 to the target infrastructure equipment 372 associated with the target cell 320.

Thus, the handover procedure may then proceed broadly in accordance with conventional handover techniques, from the point at which the infrastructure equipment 272 determines that the handover should occur. In other words, in response to the receipt of the handover message 650, the infrastructure equipment 272 initiates a preparation phase by transmitting the handover request message 406 to the infrastructure equipment 372 associated with the target cell 320. In response, if the infrastructure equipment 372 associated with the target cell 320 accepts the request, it may reserve resources in the target cell 320, and transmit the handover request acknowledgement message 410 to the first infrastructure equipment 272.

The first infrastructure equipment 272 then transmits the RRC reconfiguration message 412 to the communications device 270, instructing the communications device 270 to perform the handover to the target cell 310 and to contact the second infrastructure equipment 372, for example by means of a random access procedure 414.

In some embodiments, if the target (second) infrastructure equipment 372 does not permit the handover request, then a negative response may be sent to the source infrastructure equipment 272. In some embodiments, as described herein, communications device 270 may determine a plurality of candidate target cells, and accordingly the handover message 550 may comprise an indication of two or more candidate cells. In some such embodiments, in response to receiving the negative response, the source infrastructure equipment 272 may select another cell and repeat the handover request transmission to an infrastructure equipment associated with the selected cell.

In some embodiments, if the model generates a list of candidate cells then, if the target infrastructure equipment 372 indicates that it is not possible for the communications device 270 to be handed over to the second cell 320, the source infrastructure equipment 272 may attempt a handover preparation (i.e. transmit a handover request message) to a further target infrastructure equipment for a different cell selected from the list of candidate cells.

If the model further associates a priority with one or more of the list of candidate cells, then the priority may be used to select the different target cell and, according to identify the further target infrastructure equipment.

Accordingly, embodiments of the present technique provide a handover mechanism which can avoid the need for the transmission of measurement reports to the serving infrastructure equipment 272, and can provide an improved handover determination algorithm based on parameter values known at the communications device 270.

In the example of FIG. 6, the handover message 650 is transmitted in the serving (first) cell 310. However, in some embodiments, the handover message 650 may be transmitted in the target (second) cell 320, to the target (second) infrastructure equipment 372, for example using a random access channel.

In such embodiments, in response to receiving the handover message 650, the target infrastructure equipment 372 may determine that the handover can proceed. The target infrastructure equipment 372 may employ the same model as that used by the AI handover determination unit 1200 of the communications device 270, and may obtain as input parameter values the same input parameter values (or analogous parameter values) as generated by the input parameter determination unit 1230 of the communications device 270. Analogous parameter values may be, for example, based on measurements of uplink transmissions by the communications device 270 in place of parameter values determined by the input parameter determination unit 1230 based on measurements of downlink transmissions received by the communications device 270.

In some embodiments, the target infrastructure equipment 372 may determine to evaluate whether a handover should occur for the communications device 270. That is, the target infrastructure equipment 372 may determine to initiate one or more evaluations using the infrastructure equipment handover determination unit 1300 in respect of the communications device 270. This determination may be based on measurements of uplink reference signals transmitted by the communications device 270, received at the target infrastructure equipment 372. The determination may be further in response to receiving an indication providing configuration information related to the communications device 270 from the serving cell infrastructure equipment 272. The configuration information may comprise information to allow the target infrastructure equipment 372 to identify received uplink reference signals as being transmitted by the communications device 270.

Thus, in some embodiments, the communications device 270 sends uplink mobility reference signals (RS) which can be received by the target infrastructure equipment 372. The target infrastructure equipment 372 may determine that these are transmitted by the communications device 270, based on, for example, the configuration information. The target infrastructure equipment 372 may determine that the communications device 270 is moving towards it based on a trend of the measured received RS. Once a predefined threshold is satisfied and any other predetermined conditions are satisfied, the target infrastructure equipment 372 may request the UE context for the communications device 270 from the serving cell infrastructure equipment 272. The target infrastructure equipment 372 may then initiate use of the model in respect of the communications device 270 in order to determine whether handover is to be performed in respect of the communications device 270 to the second cell 320.

Accordingly, both the communications device 270 and the target infrastructure equipment 372 may determine substantially at the same time that a handover is to be initiated.

In some embodiments, in response to the determination at the target infrastructure equipment 372, the target infrastructure equipment 372 may prepare certain radio resources in advance such as RACH resources and a cell radio network temporary identifier (C-RNTI) and send an indication of them to the source infrastructure equipment 272 prior to the handover. In addition or alternatively, in response to the determination at the target infrastructure equipment 372, the target infrastructure equipment 372 may send a request message to the source infrastructure equipment 272 to request UE context information, and may receive in response the UE context.

In some embodiments, as an alternative, the source infrastructure equipment 272 may negotiate with the target infrastructure equipment 372 in advance of the handover for cell admission (i.e. to determine whether a handover of the communications device 270 to the second cell 320 is permitted) and for UE context information exchange.

In some embodiments, as illustrated in FIG. 5, the infrastructure equipment (such as serving cell infrastructure equipment 272 and/or target cell infrastructure equipment 372) comprises the infrastructure equipment handover determination unit 1300, which determines whether a handover should be initiated in respect of the communications device 270 and the target cell 103b. The infrastructure equipment handover determination unit 1300 may perform substantially the same evaluation as the AI handover determination unit 1200 of the communications device 270 and thus arrives at the same determination as the communications device 270. In particular, the infrastructure equipment handover determination unit may base its determination on the use of a model trained using machine learning techniques. The model may be the same as that used by the communications device 270 as described above. Accordingly, in some embodiments, the infrastructure equipment having the infrastructure equipment handover determination unit 1300 may receive a representation of the model, which may be specific to the communications device 270.

The infrastructure equipment handover determination unit may receive inputs from the infrastructure equipment input parameter determination unit 1330. In some embodiments, the input parameters are the same for the infrastructure equipment handover determination unit and the AI handover determination unit 1200. In some embodiments, the input parameters differ. For example, where the AI handover determination unit 1200 uses as an input a parameter based on measurements of transmissions by the serving cell infrastructure equipment 272 in the first cell 310, the infrastructure equipment handover determination unit 1300 may instead use a parameter based on measurements of transmissions by the communications device 270 in the first cell 310. Accordingly, the need for measurement reports transmitted by the communications device 270 to the infrastructure equipment can be avoided.

In some embodiments, the infrastructure equipment handover determination unit 1300 that makes the handover determination in respect of a potential handover to the second cell 320 controlled by the second (target) infrastructure equipment 372 may be located in the target cell infrastructure equipment 372 and the associated infrastructure equipment input parameter determination unit 1330 providing some or all of the input parameter values used by the infrastructure equipment handover determination unit 1300 may be (at least partially) in the source cell infrastructure equipment 272. Accordingly, in such embodiments, the source cell infrastructure equipment 272 may transmit an indication of the value of one or more input parameters to the target cell infrastructure equipment 372.

In some embodiments, one or more input parameter values may be transmitted from the communications device 270 to the serving cell infrastructure equipment 272 for use in the infrastructure equipment handover determination unit 1300. For example, indications of parameter values which are generally static (e.g. user profile-based or device-specific, or change very slowly, such as the current weather situation) may be transmitted well in advance of the handover decision. Other parameter values transmitted from the communications device 270 may include location and/or mobility parameters, but the present disclosure is not so limited and it will be appreciated that any combination of parameter values may be transmitted by the communications device 270 in order to permit an infrastructure equipment to evaluate using the infrastructure equipment handover determination unit 1300 whether a handover should occur.

Figure 7:
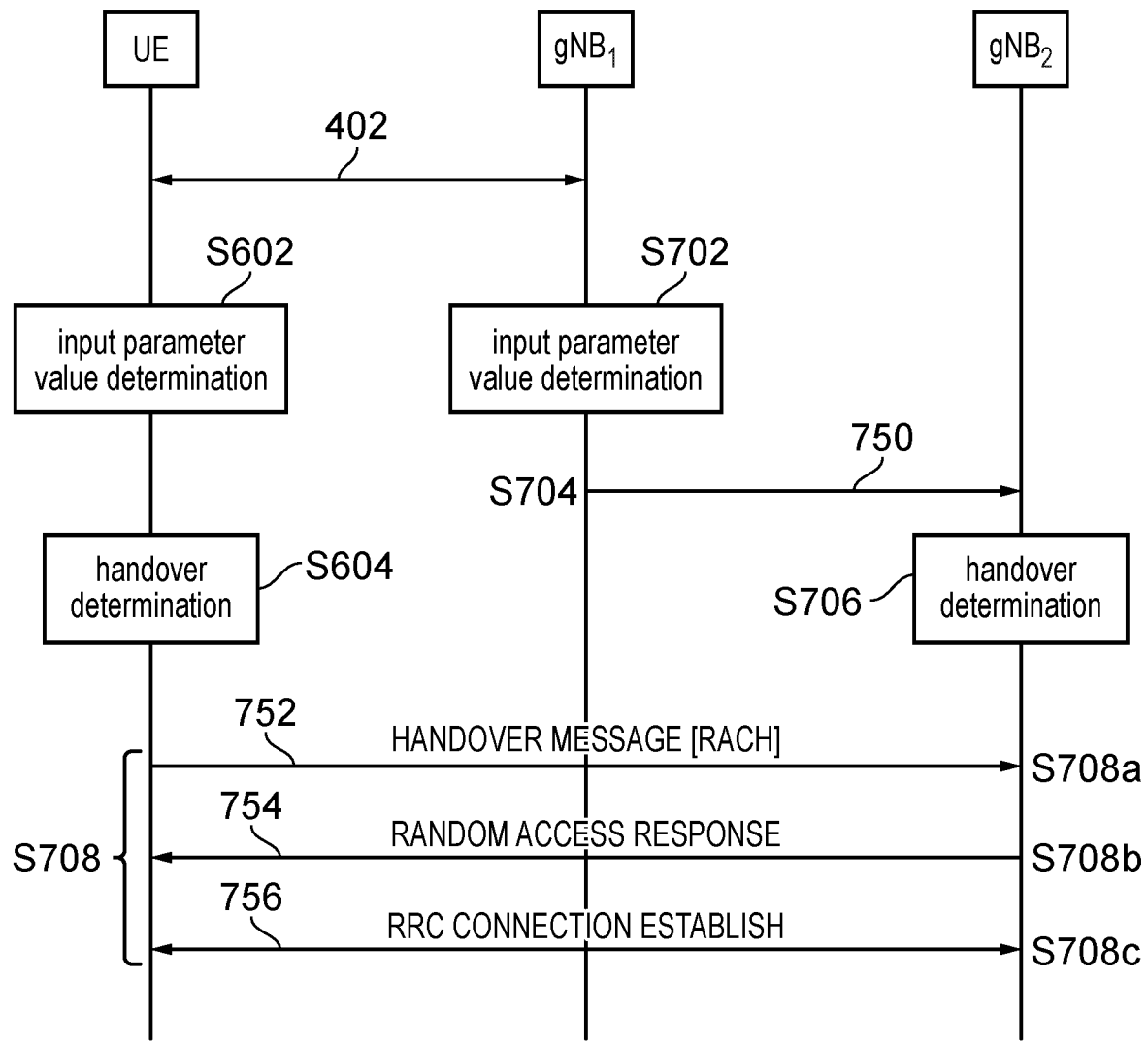
FIG. 7 illustrates a further combined process flow diagram and message sequence chart for a handover in accordance with embodiments of the present technique.

FIG. 7 illustrates a combined process flow diagram and message sequence chart for a handover in accordance with embodiments of the present technique. Messages which broadly correspond to those used in the process shown in FIG. 4 and described above are indicated with like reference numerals and their description is omitted here for conciseness. Similarly, interactions with the core network 276 are omitted for clarity and conciseness, though it will be appreciated that messages between the infrastructure equipment 272, 372 and the core network 276 may be broadly in accordance with conventional techniques.

In the process of FIG. 7, the communications device 270 carries out steps S602 and S604 as in the process of FIG. 6. In parallel and (in some embodiments) independently, the infrastructure equipment input parameter determination unit 1330 of the serving infrastructure equipment 272 at step S702 determines input parameter values, as described above.

In the example of the process in FIG. 7, it is the responsibility of the target infrastructure equipment 372 to use its infrastructure equipment handover determination unit 1300 to determine, based on input parameter values received from the source infrastructure equipment 272, whether a handover should occur. Accordingly, at step S704, the input parameter values determined by the source infrastructure equipment 272 are transmitted to the target infrastructure equipment 372, and at step S706, the infrastructure equipment handover determination unit 1300 of the target infrastructure equipment 372 determines whether a handover should occur.

Context information associated with the communications device 270 may be transmitted by the source infrastructure equipment 272 to the target infrastructure equipment 372. This may be as part of step S704 or may be earlier or later.

In response to the determination at step S604, at step S708 the communications device 270 may initiate the establishment of a connection in the second cell 320 with the target infrastructure equipment 372. S708 may comprise step S708a, in which a random access transmission 752 comprising a handover message is sent by the communications device 270. Step S708 may further comprise S708b in which a random access response message 754 is transmitted by the target infrastructure equipment 372 in response to the handover message.

Finally, S708 may comprise step S708c in which further signalling in either or both directions is transmitted in the second cell 320 for the establishment of the connection in the second cell.

Preferably, the handover determination at step S706 and step S604 result in the same result. Accordingly, the target infrastructure equipment 372 may a) recognise the handover message 752 as being from the communications device 270 and b) proceed to reserve resources in the second cell 320 for the transmission of data to and/or from the communications device 270.

In response to determination by the infrastructure equipment handover determination unit that a handover should be initiated, the serving cell infrastructure equipment 101a continues as for the case of a conventional handover, by requesting resources from the target cell infrastructure equipment 101b.

Location Information Using Sub-Cell Regions

As described above, an input to the model may be a location of the communications device 270. In some embodiments, this may be an absolute location, such as a <latitude, longitude, altitude> tuple. However, this may make the model overly complex because of the large number of possible input values for the location parameter(s).

Embodiments of the present technique can provide for the definition of spatial "sub-cell regions" within the area of geographic coverage corresponding to a cell, there being two or more such sub-cell regions within the serving cell 310.

The sub-cell region within which the communications device 270 is located may be used as an input parameter to the model. Accordingly, the complexity of the model can be reduced, while taking into account different likelihoods that a handover is appropriate depending on the geographic (physical) location of the communications device.

Similarly, in some embodiments, mobility patterns (past, present and/or predicted) may be expressed in terms of sub-cell regions. For example, a recent past mobility pattern may comprise an ordered list (earliest first) of sub-cell regions in which the communications device 270 was most recently located. A currently mobility state parameter may comprise a list of sub-cell regions in which the communications device 270 has been present within a recent predetermined time period.

In some embodiments, the model may be trained, at least in respect of the extent to which a handover is determined to be appropriate based on the sub-cell region parameter, using historical handover data. This may be by using machine-learning techniques (see elsewhere in the present description) or by a one-off configuration of model parameters (e.g. internal weights).

In some embodiments, the sub-cell regions each have dimensions of approximately 100 metres by 100 metres in orthogonal horizontal directions. In some embodiments, the sub-cell regions are approximately circular, with a diameter of approximately 300 m.

In some embodiments, the sub-cell regions forming the coverage region of the cell 310 differ in size. For example, in some embodiments, a sub-cell region near a centre of the cell 310 may be larger than sub-cell regions near the edge of the cell 310.

In some embodiments, the communications device 270 determines the sub-cell region in which it is located based on a sub-cell region indication transmitted by the serving infrastructure equipment 272. The sub-cell region indication may be transmitted using point-to-point (unicast) signalling or using broadcast signalling. For example, system information (which may be broadcast or unicast) may comprise an indication of an association between one or more sub-cell regions and their respective geographical area(s).

Figure 8:
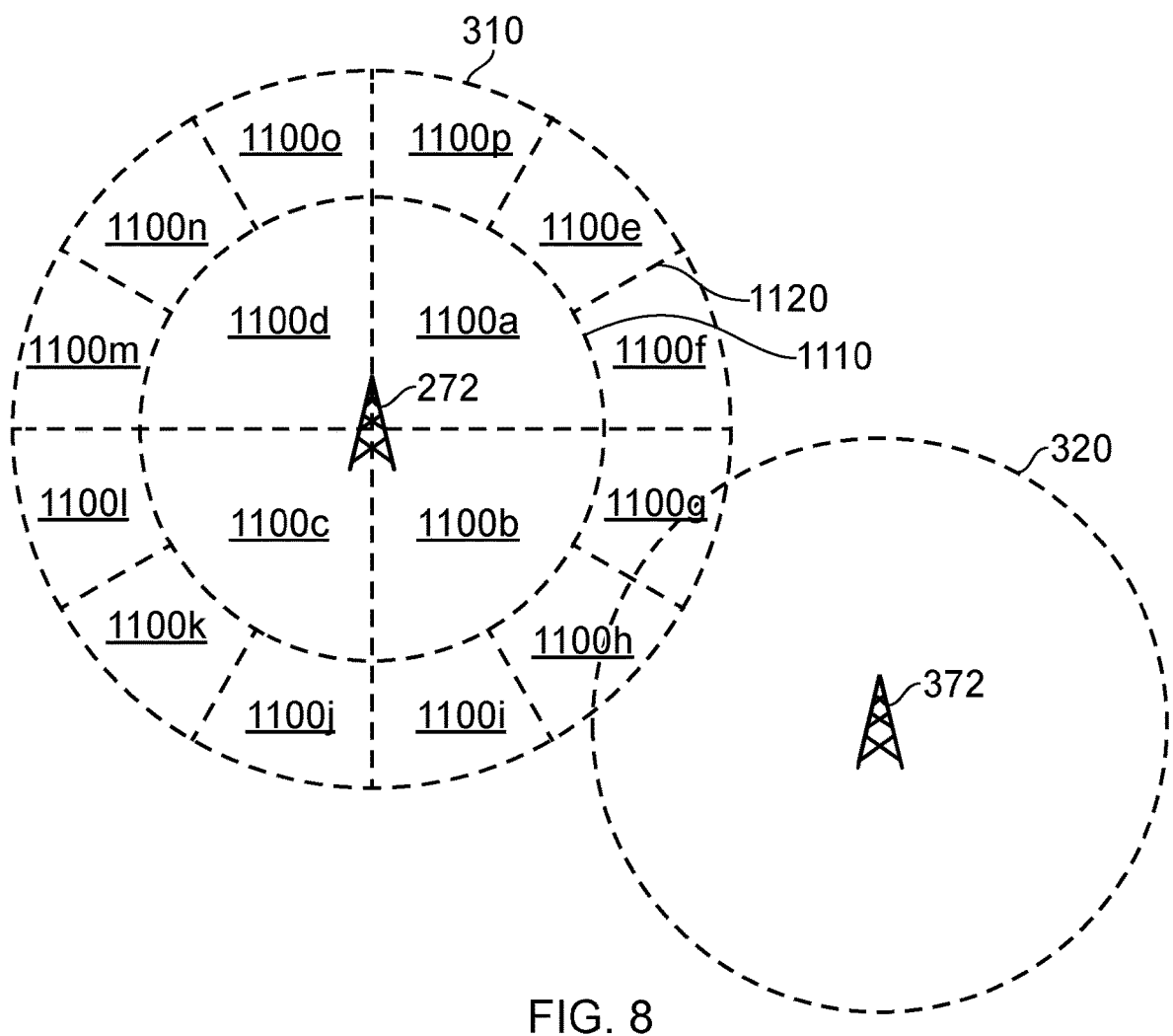
FIG. 8 illustrates a division of a geographic coverage region of a cell into sub-cell regions in accordance with embodiments of the present technique.

FIG. 8 illustrates an example of the division of the geographic coverage region of the first cell 310 into sub-cell regions 1100a to 1100p.

Preferably (as shown in FIG. 8) sub-cell regions nearer the infrastructure equipment are larger than those closer to the cell edge.

In some embodiments, a sub-cell region is bounded by one or more boundaries which are not equidistant from the transmitter of the infrastructure equipment and/or do correspond to lines of equal received signal strength levels in respect of broadcast transmissions by the transmitter of the infrastructure equipment.

For example, the boundary of the sub-cell region 1100f is defined in part by the boundary line 1110 which is a line of (substantially) equal distance from the infrastructure equipment 272, and in part by the boundary line 1120 which is a portion of a radius of the first cell 310.

In some embodiments, a sub-cell region is bounded by a boundary line which extend substantially directly away from the infrastructure equipment, for example which forms part of a radius of the cell coverage region.

As a result of the machine learning process (described below), for example, the model may determine that a handover from the first cell 310 to the second cell 320 should occur only in respect of the communications device 270 if it is moving slowly and is in one of the sub-cells 1100g or 1100h, portions of which overlap the coverage region of the second cell 320. On the other hand, when the communications device 270 is moving more rapidly, a handover may be triggered by the model while the communications device 270 is additionally in one of the sub-cells 1100f, 1100b or 1100c, depending on the direction of travel of the communications device 270.

Accordingly, embodiments of the present technique can provide a more accurate assessment of when a handover should occur, based (at least in part) on a location of a communications device within a sub-cell region of a cell's geographic coverage.

In embodiments described above, the identity of one or more sub-cell regions may be used as an input parameter to a handover determination unit (either at the communications device 270 or at an infrastructure equipment) for determining whether a handover should occur.

In some embodiments, additionally or alternatively, the communications device 270 may adapt its behaviour based on the sub-cell region in which it is currently located and/or in response to determining that the sub-cell region in which it is currently located has changed from a first sub-cell region to a second sub-cell region. For example, in some embodiments, the periodicity of performing the determination of input parameter values and determination as to whether a handover should occur may be decreased (i.e. the frequency increased) when the communications device 270 is in a sub-cell region near an edge of the cell 310, compared with when the communications device 270 is in a sub-cell region near the centre of the cell 310.

Although some embodiments of the present technique can reduce the need for measurement reports transmitted by the communications device 270 in the first (serving) cell 310, in some embodiments the frequency with which measurements are made and/or are reported to the serving infrastructure equipment 272 may be modified based on the sub-cell region within which the communications device 270 is located. For example, measurement and/or reporting frequency may be increased when the communications device 270 is in a sub-cell region near an edge of the cell 310, compared with when the communications device 270 is in a sub-cell region near the centre of the cell 310. Alternatively or additionally, thresholds used to control measurements and/or measurement reporting may be adapted based on the sub-cell region, for example such that measurements and/or reports are less likely (or even precluded) if the sub-cell region is near the centre of the cell 310.

In some embodiments, a frequency with which a report of the location (which may be in any of the forms described herein or any other appropriate form) of the communications device 270 is sent to the infrastructure equipment 272, 372 may be adapted based on the sub-cell region. For example, when the communications device 270 is located within a sub-cell region near an edge of a cell (such as in region 1100h shown in FIG. 8), a location reporting frequency may be higher than when the communications device 270 is located within a sub-cell region near a centre of a cell (such as in region 1100b shown in FIG. 8).

The communications device 270 may receive an indication of the nature of any adaptation to be carried out for one or more sub-cell regions of a cell. The indication may be transmitted by broadcast or unicast signalling within the cell, or may be semi-statically provisioned (e.g. an infrastructure equipment may transmit such an indication in respect of sub-cell regions of multiple cells). The indication may, for example, indicate required measurement reporting frequencies and/or thresholds which may be applicable in one or more sub-cell regions of one or more cells.

In some embodiments, the communications device 270 may trigger a handover evaluation using the AI handover determination unit 1200 in response to determining that it has changed its current sub-cell region.

Training the Model

In some embodiments, the model (such as that used in the AI handover determination unit 1200 or the infrastructure equipment handover determination unit 1300) is at least in part trained using machine learning. The machine learning may be performed separately, for example offline by a modelling entity.

A representation of the resulting model may be stored in non-volatile memory on the communications device 270 and/or infrastructure equipment 101. In some embodiments, a representation of the model is transmitted to the transmitting entity (and, in some embodiments, the receiving entity).

The training of the machine learning model may in some embodiments aim to minimize a loss function calculated based on input parameter values and an ideal handover outcome. For example, the output value may be a '1' if a handover is to occur, and a '0' if no handover is to occur. The ideal handover outcome may be a value of '1' if a handover attempt in the circumstances corresponding to the input parameter values would have succeeded (and therefore should have been attempted), and a '0' if a handover in the circumstances corresponding to the input parameter values would not have succeeded (and therefore should not have been initiated).

A successful handover attempt may be defined as one in which a connection was established in the target cell within a predetermined delay target. Alternatively, a successful handover attempt may be defined as one in which a connection was established in the target cell and where metrics associated with the new connection (e.g. signal strength, quality, achieved bit rate, bit error rate) satisfy pre-determined criteria.

Values for the ideal handover outcome between 0 and 1 may be used, for example, to represent handover attempts that did (or would have) resulted in a new connection but where one or more metrics associated with the new connection (e.g. signal strength, quality, achieved bit rate, bit error rate) do not satisfy pre-determined criteria.

Similarly, the output value may be greater than 0 and less than 1, with higher values indicating that it is more likely that a handover will succeed.

Thus, in some embodiments, model training is based on historical data based on actual (or potential) handovers observed in the wireless communications network. Accordingly, in some embodiments, one or more of the source infrastructure equipment 272, the target infrastructure equipment 372 and the communications device 270 may store historical handover data, for each of a plurality of attempted handovers comprising one or more of the corresponding input parameter values (such as location at the sub-cell region level), and the outcome (success or failure) of the handover or other metrics associated with the outcome of the handover (e.g. service interruption duration, bit error rate after the handover, achieved data rate after the handover).

The stored historical handover data may be transmitted to the entity responsible for training or updating the model.

In some embodiments, the training may additionally or alternatively be based on simulations of attempted handovers.

The model may iterate over a number of different values for the input parameters, and for each set of input parameter values, evaluate the loss function for different output options (e.g. no handover proceeds, a handover proceeds to a first target cell, or a handover proceeds to a second target cell).

The model may be based on, or derived from, an adaptive neural network (ANN) comprising inputs, internal nodes and weights arranged in layers, and outputs.

In some embodiments, the model comprises a plurality of weights associated with units and may be trained in accordance with the principles of the known back propagation method. For example, initially the output (loss function) is determined based on a set of input values (forward propagation) based on a test data set. Then a partial derivative (gradient) of the loss function with respect to a weight W from an output layer unit to input layer unit (back propagation) is calculated. Finally, the model updates the weight W according to the gradient of backpropagation.

In some embodiments, the model may be updated. This may be done offline (e.g. not within the communications device 270) and a representation of the updated model transferred to the communications device 270.

In some embodiments, the communications device 270 may dynamically update the model, based on previous handover attempts.

For example, in some embodiments, the communications device 270 may store, for each handover attempted, the value of the input parameters triggering the handover and an output value based on the outcome of the handover attempt.

Based on the stored parameter values and output value, the communications device 270 may update the model, for example by adjusting one or more of the weights to reduce the loss function of the model.

In some embodiments, the model may provide a classification. For example, the model may perform a function whose output is a vector, each element of the vector representing a different candidate cell, such that for a given combination of input values, the value of each element of the vector corresponds to the output value as described above, in respect of a particular candidate cell.

Figure 9:
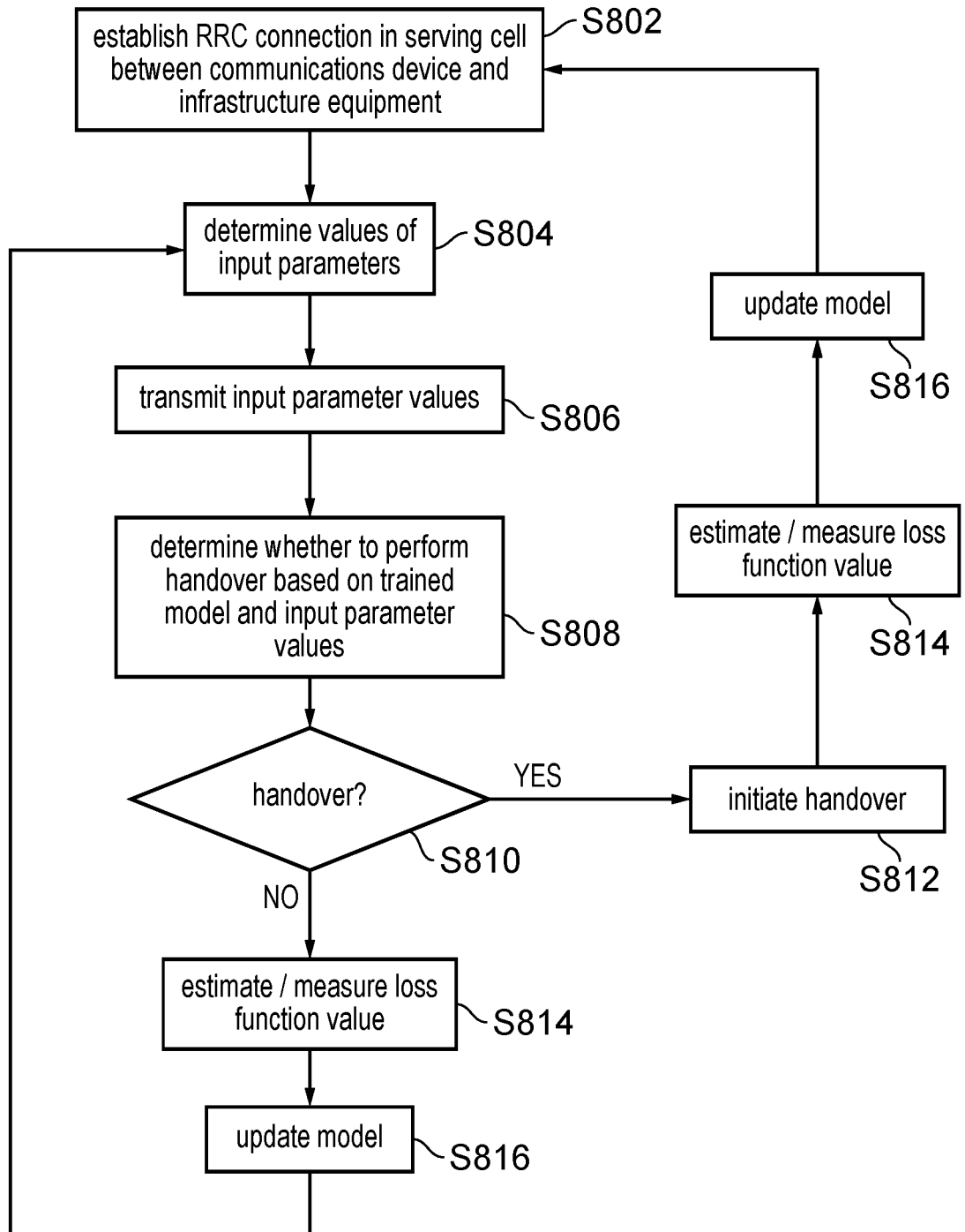
FIG. 9 illustrates a flow chart for a process which may be carried out by a communications device, and/or one or more infrastructure equipment or by a combination of these in accordance with embodiments of the present technique.

FIG. 9 illustrates a flow chart for a process which may be carried out by the communications device 270, the serving infrastructure equipment 272 and/or the target infrastructure equipment 372, and/or by a combination of these.

At step S802, the communications device 270 has an established RRC connection in the serving cell 310 allowing the transmission and reception of data.

Subsequently, at step S804, input parameter values are determined, as described above.

Subsequently, at step S808, the model trained in accordance with machine learning techniques is used to determine, based on the values of the input parameters determined at step S804, whether a handover should occur and if so, in some embodiments, to which of a plurality of candidate cells the handover should occur. As described above, in some embodiments, the model may generate an output comprising an indication of one or more cells and an indication of respective associated priorities and/or respective associated probabilities.

As described above, steps S804 (or a portion thereof) and S808 may be carried out within different entities. For example, step S804 may be carried out by the serving infrastructure equipment 272, and step S808 may be carried out by the (potential) target infrastructure equipment 372. Accordingly, in some embodiments, step S806 may follow step S804 and precede step S808. In step S806, some or all of the input parameter values determined at step S804 are transmitted from one entity to another.

In some embodiments, step S808 of the process may follow directly from step S804.

At step S810, it is determined, based on the outcome of step S808, whether a handover is to be imitated. For example, in some embodiments, the outcome of the determination at step S808 may be over-ridden based on parameters which are not assessed in step S804.

If at step S810, it is determined that a handover is to occur, then the process continues with step S812, in which the appropriate steps are taken to trigger the handover. This may comprise, for example, transmitting a request for the handover from the communications device 270 to the serving infrastructure equipment 272 or the target infrastructure equipment 372 (where the decision at step S810 is taken by the communications device 270). Where the decision at step S810 is taken by serving infrastructure equipment, step S812 may comprise conventional procedures for initiating a handover, such as in accordance with the process illustrated in FIG. 4 and described above.

Following step S810, other steps as necessary for the completion of the handover (such as illustrated in one or more of FIG. 4, FIG. 6 and FIG. 7 and described above) may occur; these are not shown in FIG. 9 for conciseness. After the handover is complete, the process continues with step S802, in which the communications device 270 has an RRC connection established in the new serving cell (e.g. the second cell 320) with the new serving infrastructure equipment (e.g. the second infrastructure equipment 372).

If at step S810 it is determined not to proceed with a handover, then control returns to step S804 and a further determination of the input parameter values takes place. Subsequent iterations of step S804 may be delayed, for example to wait for a particular trigger (e.g. a value crossing a pre-determined threshold) and/or to occur at a pre-determined periodicity.

As part of the process illustrated in FIG. 9, an evaluation or estimation of the loss function value corresponding to the outcome selected by the model at step S808 may be done at step S814, and the model used in the determination at step S808 may be updated at step S816, based on the input parameter values determined at step S804 and the determined (e.g. estimated) loss function. In FIG. 9, these steps are shown as occurring after step S810 (when no handover is initiated) and after step S812 when a handover is initiated. However, it will be appreciated that these steps may occur in a different sequence. For example, following step S812, the process may return to step S802 (i.e. the RRC connection may be established in the new cell) before steps S814 and S816 occur.

Figure 10:
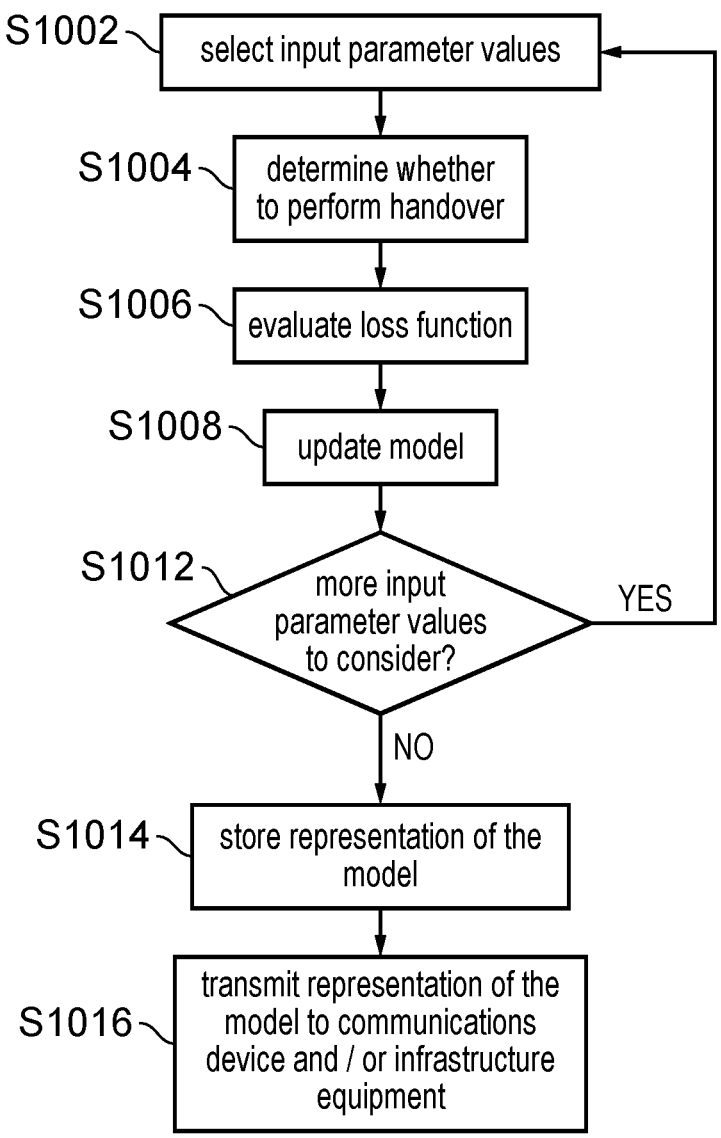
FIG. 10 illustrates a flow chart for a process carried out by a modelling entity in accordance with embodiments of the present technique.

FIG. 10 illustrates a flow chart for a process carried out by a modelling entity in accordance with embodiments of the present technique.

The modelling entity may comprise a core network equipment, or a conventional networked processor, or an infrastructure equipment, or a combination of these, having a processor, computer readable storage (such as random access memory) and a means for transferring a representation of the model, such as a network interface or removable storage.

The process of FIG. 10 starts at step S1002 in which values for one or more input parameters are determined. These may be determined in a deterministic manner (e.g. by selecting a next in sequence value from a predetermined range of values for each respective input parameter), may be randomly selected, or may be based on actual scenarios previously encountered. The method of selection may be different for different parameters: for example, a location of the communications device 270 may be selected randomly, while a signal quality parameter may be increased in steps. Step S1002 may comprise (or follow) receiving a plurality of input parameter values, for example from one or more communications devices.

At step S1004, it is determined whether the loss function should be evaluated for the case where a handover is performed, or where the handover is not performed. This determination may be made based on a current version of the model, based on an actual handover decision made in circumstances corresponding to the input parameter values, or in any other way.

At step S1006, a loss function corresponding to the decision selected at step S1004 and the input parameter values selected at step S1002 is determined. Preferably, the loss function is non-decreasing as the relative 'quality' of the handover decision increases. Cost may be correspond to, or represent for example a service interruption time, a bit error rate or signal quality or strength achieved after the handover. The cost may be based on a metric associated with the connection which is used after the handover decision selected in step S1004, and may be further based on a metric associated with a connection which would have been used if the opposite handover decision had bee selected in step S1004. Any suitable loss function may be used.

The loss function may be determined by simulation, or by data acquired corresponding to actual data transmissions.

Based on the loss function determined at step S1006, the model is updated. The update may be automatic, in accordance with known machine learning techniques. For example, if the current (non-updated) model indicates that for the input parameter values selected at step S1002 a particular handover decision should be made, and it is determined that the loss function determined at step S1006 is lower for the handover decision selected at step S1004 than for the decision currently suggested according to the model, then the model may be updated so that for the input parameter values selected at step S1002, the decision selected at step S1004 is recommended by the updated model, or at least is more likely to be recommended.

At step S1012, it is determined if further input parameter values are to be considered. If so, then control returns to step S1002, otherwise control passes to step S1014.

In step S1014, a representation of the updated model is stored, for example on a computer-readable medium.

At step S1016, a representation of the model is transmitted to one or more of the communications device 270 and the first and second infrastructure equipment 272, 372. The transmission in step S1016 may be via a wireless access interface (such as via the wireless communications network shown in FIG. 5) or may be via a wired interface (such as during a manufacturing process).

The representation of the model transmitted at step S1016 may be a reduced representation of the model stored at step S1014. For example, the model stored at step S1016 may comprise an indication of the value of the loss function determined at step S1006, while the reduced model representation transmitted at step S1016 may provide only a means to determine the outputs (e.g. an indication of whether a handover should be initiated) based on input parameter values.

In some embodiments, one or more of the steps of the processes illustrated in FIG. 6, FIG. 7, FIG. 9, and FIG. 10 may be modified, omitted or performed in a different order. Above have been given descriptions of example processes combining sequences of steps and messages in combination. The scope of the present disclosure is not, however, limited to such specific combinations and in some embodiments, various of the steps and messages described may be omitted, or combined in a different order, or modified.

In the embodiments described above, the first cell and second cell are controlled (that is, generated by) first and second infrastructure equipment of the wireless communications network. However, the present disclosure is not so limited. For example, one or both of the first and second cell may be controlled by another communications device, which may be providing a peer-to-peer connection in the cell, or acting as a relay device.

In some embodiments (such as illustrated in FIG. 5) the model trained using machine learning techniques is used by the infrastructure equipment which controls a cell (e.g. generates a wireless access interface for allowing communications with a communications device). In some embodiments, the model may be used in another entity, which may receive input parameter values and/or may determine input parameter values based on indications received from other entities, such as the source infrastructure equipment 272 and the communications device 270. Accordingly, the entity hosting the model may transmit an indication that the handover should proceed to one or more of the source infrastructure equipment 272, the target infrastructure equipment 372 and the communications device 270.

Thus there has been described a method of transmitting or receiving data by a communications device in a wireless communications network, the method comprising: establishing a connection for transmitting or receiving the data in a first cell of the wireless communications network, determining a value of one or more input parameters, using the value of the one or more input parameters as inputs to a model trained using machine learning, determining, based on an output of the model, that the communications device should perform a handover to establish a connection in a second cell, and responsive to determining that the communications device should establish a connection in the second cell, transmitting a handover message to request the establishment of a connection in a second cell.

There has also been described a method of transmitting or receiving data by a communications device in a wireless communications network, the method comprising: establishing a connection for transmitting or receiving the data in a first cell of the wireless communications network, a geographic coverage region corresponding to the first cell comprising a plurality of sub-cell regions, determining one of the sub-cell regions as a current sub-cell region in which the communications device is located, determining that the current sub-cell region has changed, and in response to the determining that the current sub-cell region has changed, adapting based on the new current sub-cell region, one or more of a cell measurement threshold, a cell measurement frequency, a measurement report reporting threshold, and a measurement report frequency.

There has also been described a method of operating an infrastructure equipment in a wireless communications network, the method comprising: establishing a connection with a communications device for transmitting or receiving the data in a first cell of the wireless communications network, and transmitting to the communications device a representation of a model trained using machine learning, the model for determining, based on the value of the one or more input parameters, that the communications device should perform a handover to establish a connection in a second cell.

There has also been described a method of operating an infrastructure equipment in a wireless communications network, the method comprising: establishing a connection with a communications device for transmitting or receiving the data in a first cell of the wireless communications network, a geographic coverage region corresponding to the first cell comprising a plurality of sub-cell regions, transmitting to the communications device an indication for determining, by the communications device, one of the sub-cell regions as a current sub-cell region in which the communications device is located.

There has also been described a method of transmitting data to or receiving data from a communications device by an infrastructure equipment in a wireless communications network, the method comprising: establishing a connection with the communications device for transmitting or receiving the data in a first cell of the wireless communications network, determining a value of one or more input parameters, using the value of the one or more input parameters as inputs to a model trained using machine learning determining, based on an output of the model, that the communications device should perform a handover to establish a connection in a second cell, and responsive to determining that the communications device should establish a connection in the second cell, transmitting a handover request message to a second infrastructure equipment associated with the second cell to request the establishment of a connection in the second cell.

There has also been described a method of transmitting data to or receiving data from a communications device by an infrastructure equipment controlling a first cell in a wireless communications network, the method comprising: determining a value of one or more input parameters, using the value of the one or more input parameters as inputs to a model trained using machine learning, determining, based on an output of the model, that a communications device currently having an established connection in a second cell should perform a handover to establish a connection in the first cell, and responsive to determining that the communications device should establish a connection in the cell, establishing a connection with the communications device for transmitting or receiving the data in the first cell.

There has also been described a method of training by machine learning a model, the method comprising: a) selecting a value of one or more input parameters, b) determining based on the model and the input parameters whether a handover should occur in respect of a communications device, c) evaluating a loss function, d) adapting one or more parameters of the model based on the evaluation of the loss function, repeating the steps a)-d) for different selected input parameter values, and storing on a computer readable medium a representation of the model.

Also described are a communications device, infrastructure equipment and circuitry.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communications network.

It will further be appreciated that the principles described herein are not applicable only to LTE-based wireless telecommunications systems, but are applicable for any type of cellular wireless telecommunications system where a cell is generated by an infrastructure, as well as for peer-to-peer connections, such as when a 'cell' is generated by another communications device which may be providing a device-to-device connection or may be part of a larger mesh communications network.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting or receiving data by a communications device in a wireless communications network, the method comprising: establishing a connection for transmitting or receiving the data in a first cell of the wireless communications network, determining a value of one or more input parameters, using the value of the one or more input parameters as inputs to a model trained using machine learning, determining, based on an output of the model, that the communications device should perform a handover to establish a connection in a second cell, and responsive to determining that the communications device should establish a connection in the second cell, transmitting a handover message to request the establishment of a connection in a second cell.

Paragraph 2. A method according to paragraph 1, the method comprising determining using the model an identity of the second cell, wherein the handover message comprises an indication of the identity of the second cell.

Paragraph 3. A method according to paragraph 1 or paragraph 2, the method comprising determining using the model an identity of a plurality of cells, the plurality of cells including the second cell, wherein the handover message comprises an indication of the identity of each of the plurality of cells.

Paragraph 4. A method according to paragraph 3, the method comprising determining using the model a priority associated with each of the plurality of cells, wherein the handover message comprises an indication of the priority associated with of each of the plurality of cells.

Paragraph 5. A method according to any of paragraphs 1 to 4, wherein the input parameters comprise one or more of a measurement result associated with one or more cells of the wireless communications network, a rate of change of measurement results associated with the one or more cells of the wireless communications network, a direction of motion of the communications device, a speed of motion of the communications device, a location of the communications device, a current time of day, a current date, a current weather condition in the first cell, one or more parameters associated with a user of the communications device, one or more characteristics of the communications device, an identity of one or more cells in which the communications device most frequently establishes a connection, a history of cells used by the communications device, and a mobility status of the communications device.

Paragraph 6. A method according to any of paragraphs 1 to 5, wherein the connection is established in the first cell with a first infrastructure equipment associated with the first cell.

Paragraph 7. A method according to paragraph 6, wherein the handover message is transmitted to the first infrastructure equipment.

Paragraph 8. A method according to any of paragraphs 1 to 7, wherein the second cell is associated with a second infrastructure equipment.

Paragraph 9. A method according to paragraph 8, wherein the handover message is transmitted to the second infrastructure equipment associated with the second cell.

Paragraph 10. A method according to any of paragraphs 1 to 9, wherein a coverage region corresponding to the first cell comprises a plurality of sub-cell regions, the method further comprising determining one of the sub-cell regions as a current sub-cell region in which the communications device is located, and wherein the input parameters comprise an identity of the current sub-cell region.

Paragraph 11. A method according to paragraph 10, wherein the output of the model comprises an indication of a probability of a successful handover to the second cell.

Paragraph 12. A method according to paragraph 10 or paragraph 11, the method comprising receiving an indication of the current sub-cell region transmitted by a first infrastructure equipment associated with the first cell.

Paragraph 13. A method according to paragraph 10 or paragraph 11, the method comprising receiving an indication of regions corresponding to the plurality of sub-cell regions, and determining a current location of the communications device, wherein determining the one of the sub-cell regions as the current sub-cell region in which the communications device is located is based on the current location and the indication of the regions corresponding to the plurality of sub-cell regions.

Paragraph 14. A method according to any of paragraphs 10 to 13, the method comprising determining that the current sub-cell region has changed, wherein the using the value of the one or more input parameters as inputs to the model trained using machine learning is in response to determining that the current sub-cell region has changed.

Paragraph 15. A method according to any of paragraphs 10 to 14, the method comprising determining that the current sub-cell region has changed, and in response to the determining that the current sub-cell region has changed, adapting based on the new current sub-cell region, one or more of a cell measurement threshold, a cell measurement frequency, a measurement report reporting threshold, and a measurement report frequency. a location report frequency.

Paragraph 16. A method of transmitting or receiving data by a communications device in a wireless communications network, the method comprising: establishing a connection for transmitting or receiving the data in a first cell of the wireless communications network, a geographic coverage region corresponding to the first cell comprising a plurality of sub-cell regions, determining one of the sub-cell regions as a current sub-cell region in which the communications device is located, determining that the current sub-cell region has changed, and in response to the determining that the current sub-cell region has changed, adapting based on the new current sub-cell region, one or more of a cell measurement threshold, a cell measurement frequency, a measurement report reporting threshold, and a measurement report frequency.

Paragraph 17. A method according to paragraph 16, wherein the first cell is associated with a first infrastructure equipment, the method comprising receiving an indication of the current sub-cell region transmitted by the first infrastructure equipment.

Paragraph 18. A method according to paragraph 16, the method comprising receiving an indication of regions corresponding to the plurality of sub-cell regions, and determining a current location of the communications device, wherein determining the one of the sub-cell regions as the current sub-cell region in which the communications device is located is based on the current location and the indication of the regions corresponding to the plurality of sub-cell regions.

Paragraph 19. A method of operating an infrastructure equipment in a wireless communications network, the method comprising: establishing a connection with a communications device for transmitting or receiving the data in a first cell of the wireless communications network, and transmitting to the communications device a representation of a model trained using machine learning, the model for determining, based on the value of the one or more input parameters, that the communications device should perform a handover to establish a connection in a second cell.

Paragraph 20. A method according to paragraph 19, the method comprising receiving from the communications device a handover message to request the establishment of a connection in a second cell.

Paragraph 21. A method of operating an infrastructure equipment in a wireless communications network, the method comprising: establishing a connection with a communications device for transmitting or receiving the data in a first cell of the wireless communications network, a geographic coverage region corresponding to the first cell comprising a plurality of sub-cell regions, transmitting to the communications device an indication for determining, by the communications device, one of the sub-cell regions as a current sub-cell region in which the communications device is located.

Paragraph 22. A method according to paragraph 21, wherein the indication comprises an indication of the current sub-cell region.

Paragraph 23. A method according to paragraph 21, wherein the indication comprises an indication of regions corresponding to the plurality of sub-cell regions.

Paragraph 24. A method of transmitting data to or receiving data from a communications device by an infrastructure equipment in a wireless communications network, the method comprising: establishing a connection with the communications device for transmitting or receiving the data in a first cell of the wireless communications network, determining a value of one or more input parameters, using the value of the one or more input parameters as inputs to a model trained using machine learning determining, based on an output of the model, that the communications device should perform a handover to establish a connection in a second cell, and responsive to determining that the communications device should establish a connection in the second cell, transmitting a handover request message to a second infrastructure equipment associated with the second cell to request the establishment of a connection in the second cell.

Paragraph 25. A method according to paragraph 24, the method comprising determining using the model an identity of the second cell.

Paragraph 26. A method according to paragraph 24 or paragraph 25, the method comprising determining using the model an identity of a plurality of cells, the plurality of cells including the second cell.

Paragraph 27. A method according to paragraph 26, the method comprising determining using the model a priority associated with each of the plurality of cells.

Paragraph 28. A method according to any of paragraphs 24 to 27, wherein the input parameters comprise one or more of a measurement result associated with one or more cells of the wireless communications network, a rate of change of measurement results associated with the one or more cells of the wireless communications network, a direction of motion of the communications device, a speed of motion of the communications device, a location of the communications device, a current time of day, a current date, a current weather condition in the first cell, one or more parameters associated with a user of the communications device, one or more characteristics of the communications device, an identity of one or more cells in which the communications device most frequently establishes a connection, a history of cells used by the communications device, and a mobility status of the communications device.

Paragraph 29. A method according to any of paragraphs 24 to 28, wherein a coverage region corresponding to the first cell comprises a plurality of sub-cell regions, wherein the input parameters comprise an identity of the current sub-cell region.

Paragraph 30. A method according to paragraph 29, wherein the output of the model comprises an indication of a probability of a successful handover to the second cell.

Paragraph 31. A method according to paragraph 29 or paragraph 30, the method comprising transmitting to the communications device an indication, in respect of each of one or more of the plurality of sub-cell regions, of one or more of a cell measurement threshold, a cell measurement frequency, a measurement report reporting threshold, and a measurement report frequency. a location report frequency, to be used by the communications device in the each of the respective sub-cell regions.

Paragraph 32. A method of transmitting data to or receiving data from a communications device by an infrastructure equipment controlling a first cell in a wireless communications network, the method comprising: determining a value of one or more input parameters, using the value of the one or more input parameters as inputs to a model trained using machine learning, determining, based on an output of the model, that a communications device currently having an established connection in a second cell should perform a handover to establish a connection in the first cell, and responsive to determining that the communications device should establish a connection in the cell, establishing a connection with the communications device for transmitting or receiving the data in the first cell.

Paragraph 33. A method according to paragraph 32, wherein determining a value of one or more input parameters comprises receiving an indication of the value of one or more of the input parameters from a second infrastructure equipment controlling the second cell.

Paragraph 34. A method according to paragraph 32 or paragraph 33, wherein the input parameters comprise one or more of a measurement result associated with one or more cells of the wireless communications network, a rate of change of measurement results associated with the one or more cells of the wireless communications network, a direction of motion of the communications device, a speed of motion of the communications device, a location of the communications device, a current time of day, a current date, a current weather condition in the first cell, one or more parameters associated with a user of the communications device, one or more characteristics of the communications device, an identity of one or more cells in which the communications device most frequently establishes a connection, a history of cells used by the communications device, and a mobility status of the communications device.

Paragraph 35. A method of training by machine learning a model, the method comprising: a) selecting a value of one or more input parameters, b) determining based on the model and the input parameters whether a handover should occur in respect of a communications device, c) evaluating a loss function, d) adapting one or more parameters of the model based on the evaluation of the loss function, repeating the steps a)-d) for different selected input parameter values, and storing on a computer readable medium a representation of the model.

Paragraph 36. A computer readable medium having stored on it a program which, when executed by a processor, causes the processor to carry out the method as defined in paragraph 35.

Paragraph 37. A communications device operating in a wireless communications network, the communications device comprising a transmitter configured to transmit signals via a wireless access interface of the wireless communications network, a receiver configured to receive signals transmitted via the wireless access interface, and a controller configured to control the transmitter and the receiver so that the communications device is operable: to establish a connection for transmitting or receiving data in a first cell of the wireless communications network, to determine a value of one or more input parameters, to use the value of the one or more input parameters as inputs to a model trained using machine learning, to determine, based on an output of the model, that the communications device should perform a handover to establish a connection in a second cell, and responsive to determining that the communications device should establish a connection in the second cell, to transmit a handover message to request the establishment of a connection in a second cell.

Paragraph 38. Circuitry for a communications device operating in a wireless communications network, the circuitry comprising transmitter circuitry configured to transmit signals via a wireless access interface of the wireless communications network, receiver circuitry configured to receive signals transmitted via the wireless access interface, and controller circuitry configured to control the transmitter circuitry and the receiver circuitry so that the communications device is operable: to establish a connection for transmitting or receiving data in a first cell of the wireless communications network, to determine a value of one or more input parameters, to use the value of the one or more input parameters as inputs to a model trained using machine learning, to determine, based on an output of the model, that the communications device should perform a handover to establish a connection in a second cell, and responsive to determining that the communications device should establish a connection in the second cell, to transmit a handover message to request the establishment of a connection in a second cell.

Paragraph 39. A communications device operating in a wireless communications network, the communications device comprising a transmitter configured to transmit signals via a wireless access interface of the wireless communications network, a receiver configured to receive signals transmitted via the wireless access interface, and a controller configured to control the transmitter and the receiver so that the communications device is operable: to establish a connection for transmitting or receiving data in a first cell of the wireless communications network, a geographic coverage region corresponding to the first cell comprising a plurality of sub-cell regions, to determine one of the sub-cell regions as a current sub-cell region in which the communications device is located, to determine that the current sub-cell region has changed, and in response to the determining that the current sub-cell region has changed, to adapt based on the new current sub-cell region, one or more of a cell measurement threshold, a cell measurement frequency, a measurement report reporting threshold, and a measurement report frequency.

Paragraph 40. Circuitry for a communications device operating in a wireless communications network, the circuitry comprising transmitter circuitry configured to transmit signals via a wireless access interface of the wireless communications network, receiver circuitry configured to receive signals transmitted via the wireless access interface, and controller circuitry configured to control the transmitter circuitry and the receiver circuitry so that the communications device is operable: to establish a connection for transmitting or receiving data in a first cell of the wireless communications network, a geographic coverage region corresponding to the first cell comprising a plurality of sub-cell regions, to determine one of the sub-cell regions as a current sub-cell region in which the communications device is located, to determine that the current sub-cell region has changed, and in response to the determining that the current sub-cell region has changed, to adapt based on the new current sub-cell region, one or more of a cell measurement threshold, a cell measurement frequency, a measurement report reporting threshold, and a measurement report frequency.

Paragraph 41. Infrastructure equipment for use in a wireless communications network, the wireless communications network comprising the infrastructure equipment providing a wireless access interface in a first cell, the infrastructure equipment comprising a transmitter configured to transmit signals to a communications device via the wireless access interface in the cell, a receiver configured to receive signals from the communications device, and a controller configured to control the transmitter and the receiver so that the infrastructure equipment is operable: to establish a connection with a communications device for transmitting or receiving data in the first cell, and to transmit to the communications device a representation of a model trained using machine learning, the model for determining, based on the value of the one or more input parameters, that the communications device should perform a handover to establish a connection in a second cell.

Paragraph 42. Circuitry for infrastructure equipment for use in a wireless communications network, the wireless communications network comprising the infrastructure equipment providing a wireless access interface in a first cell, the circuitry comprising transmitter circuitry configured to transmit signals to a communications device via the wireless access interface in the cell, receiver circuitry configured to receive signals from the communications device, and controller circuitry configured to control the transmitter circuitry and the receiver circuitry so that the infrastructure equipment is operable: to establish a connection with a communications device for transmitting or receiving data in the first cell, and to transmit to the communications device a representation of a model trained using machine learning, the model for determining, based on the value of the one or more input parameters, that the communications device should perform a handover to establish a connection in a second cell.

Paragraph 43. Infrastructure equipment for use in a wireless communications network, the wireless communications network comprising the infrastructure equipment providing a wireless access interface in a first cell, the infrastructure equipment comprising a transmitter configured to transmit signals to a communications device via the wireless access interface in the cell, a receiver configured to receive signals from the communications device, and a controller configured to control the transmitter and the receiver so that the infrastructure equipment is operable: to establish a connection with a communications device for transmitting or receiving the data in a first cell, a geographic coverage region corresponding to the first cell comprising a plurality of sub-cell regions, to transmit to the communications device an indication for determining, by the communications device, one of the sub-cell regions as a current sub-cell region in which the communications device is located.

Paragraph 44. Circuitry for infrastructure equipment for use in a wireless communications network, the wireless communications network comprising the infrastructure equipment providing a wireless access interface in a first cell, the circuitry comprising transmitter circuitry configured to transmit signals to a communications device via the wireless access interface in the cell, receiver circuitry configured to receive signals from the communications device, and controller circuitry configured to control the transmitter circuitry and the receiver circuitry so that the infrastructure equipment is operable: to establish a connection with a communications device for transmitting or receiving the data in a first cell, a geographic coverage region corresponding to the first cell comprising a plurality of sub-cell regions, to transmit to the communications device an indication for determining, by the communications device, one of the sub-cell regions as a current sub-cell region in which the communications device is located.

Paragraph 45. Infrastructure equipment for use in a wireless communications network, the wireless communications network comprising the infrastructure equipment providing a wireless access interface in a first cell, the infrastructure equipment comprising a transmitter configured to transmit signals to a communications device via the wireless access interface in the cell, a receiver configured to receive signals from the communications device, and a controller configured to control the transmitter and the receiver so that the infrastructure equipment is operable: to establish a connection with the communications device for transmitting or receiving data in the first cell, to determine a value of one or more input parameters, to use the value of the one or more input parameters as inputs to a model trained using machine learning to determine, based on an output of the model, that the communications device should perform a handover to establish a connection in a second cell, and responsive to determining that the communications device should establish a connection in the second cell, to transmit a handover request message to a second infrastructure equipment associated with the second cell to request the establishment of a connection in the second cell.

Paragraph 46. Circuitry for infrastructure equipment for use in a wireless communications network, the wireless communications network comprising the infrastructure equipment providing a wireless access interface in a first cell, the circuitry comprising a transmitter circuitry configured to transmit signals to a communications device via the wireless access interface in the cell, a receiver circuitry configured to receive signals from the communications device, and a controller circuitry configured to control the transmitter circuitry and the receiver circuitry so that the infrastructure equipment is operable: to establish a connection with the communications device for transmitting or receiving data in the first cell, to determine a value of one or more input parameters, to use the value of the one or more input parameters as inputs to a model trained using machine learning to determine, based on an output of the model, that the communications device should perform a handover to establish a connection in a second cell, and responsive to determining that the communications device should establish a connection in the second cell, to transmit a handover request message to a second infrastructure equipment associated with the second cell to request the establishment of a connection in the second cell.

Paragraph 47. Infrastructure equipment for use in a wireless communications network, the wireless communications network comprising the infrastructure equipment providing a wireless access interface in a first cell, the infrastructure equipment comprising a transmitter configured to transmit signals to a communications device via the wireless access interface in the cell, a receiver configured to receive signals from the communications device, and a controller configured to control the transmitter and the receiver so that the infrastructure equipment is operable: to determine a value of one or more input parameters, to use the value of the one or more input parameters as inputs to a model trained using machine learning, to determine, based on an output of the model, that a communications device currently having an established connection in a second cell should perform a handover to establish a connection in the first cell, and responsive to determining that the communications device should establish a connection in the cell, to establish a connection with the communications device for transmitting or receiving the data in the first cell.

Paragraph 48. Circuitry for infrastructure equipment for use in a wireless communications network, the wireless communications network comprising the infrastructure equipment providing a wireless access interface in a first cell, the circuitry comprising transmitter circuitry configured to transmit signals to a communications device via the wireless access interface in the cell, receiver circuitry configured to receive signals from the communications device, and controller circuitry configured to control the transmitter circuitry and the receiver circuitry so that the infrastructure equipment is operable: to determine a value of one or more input parameters, to use the value of the one or more input parameters as inputs to a model trained using machine learning, to determine, based on an output of the model, that a communications device currently having an established connection in a second cell should perform a handover to establish a connection in the first cell, and responsive to determining that the communications device should establish a connection in the cell, to establish a connection with the communications device for transmitting or receiving the data in the first cell.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2(Release 15)", June 2018
[2] Holma H. and Toskala A, "LTE for UMTS OFDMA and SC-FDMA based radio access", John Wiley and Sons, 2009
[3] Dalman E, Parkvall S. and Skold J., "5G NR The next generation wireless access technology", Academic Press, 2018

What is claimed is:

1. A method of transmitting or receiving data by a communications device in a wireless communications network, the method comprising:
    establishing a connection for transmitting or receiving the data in a first cell of the wireless communications network,
    determining a value of one or more input parameters,
    using the value of the one or more input parameters as inputs to a model trained using machine learning,
    determining, based on an output of the model, that the communications device should perform a handover to establish a connection in a second cell,
    determining using the model an identity of each of a plurality of cells, the plurality of cells including the second cell, and
    responsive to determining that the communications device should establish a connection in the second cell, transmitting a handover message to request the establishment of a connection in the second cell,
    wherein the handover message comprises an indication of the identity of each of the plurality of cells.

2. The method according to claim 1, further comprising: determining using the model a priority associated with each of the plurality of cells, wherein the handover message comprises an indication of the priority associated with of each of the plurality of cells.

3. The method according to claim 1, wherein the input parameters comprise one or more of:
    a measurement result associated with one or more cells of the wireless communications network,
    a rate of change of measurement results associated with the one or more cells of the wireless communications network,
    a direction of motion of the communications device,
    a speed of motion of the communications device,
    a location of the communications device,
    a current time of day,
    a current date,
    a current weather condition in the first cell,
    one or more parameters associated with a user of the communications device,
    one or more characteristics of the communications device,
    an identity of one or more cells in which the communications device most frequently establishes a connection,
    a history of cells used by the communications device, and
    a mobility status of the communications device.

4. The method according to claim 1, wherein the connection is established in the first cell with a first infrastructure equipment associated with the first cell.

5. The method according to claim 4, wherein the handover message is transmitted to the first infrastructure equipment.

6. The method according to claim 1, wherein the second cell is associated with a second infrastructure equipment.

7. The method according to claim 6, wherein the handover message is transmitted to the second infrastructure equipment associated with the second cell.

8. The method according to claim 1, wherein a coverage region corresponding to the first cell comprises a plurality of sub-cell regions, the method further comprising:
    determining one of the sub-cell regions as a current sub-cell region in which the communications device is located, and wherein
    the input parameters comprise an identity of the current sub-cell region.

9. The method according to claim 8, wherein the output of the model comprises an indication of a probability of a successful handover to the second cell.

10. The method according to claim 8, further comprising:
    receiving an indication of the current sub-cell region transmitted by a first infrastructure equipment associated with the first cell.

11. The method according to claim 8, further comprising:
    receiving an indication of regions corresponding to the plurality of sub-cell regions, and
    determining a current location of the communications device, wherein
    determining the one of the sub-cell regions as the current sub-cell region in which the communications device is located is based on the current location and the indication of the regions corresponding to the plurality of sub-cell regions.

12. The method according to claim 8, further comprising:
determining that the current sub-cell region has changed, wherein
the using the value of the one or more input parameters as inputs to the model trained using machine learning is in response to determining that the current sub-cell region has changed.

13. The method according to claim 8, further comprising:
determining that the current sub-cell region has changed, and
in response to the determining that the current sub-cell region has changed, adapting based on the new current sub-cell region, one or more of
a cell measurement threshold,
a cell measurement frequency,
a measurement report reporting threshold, and
a measurement report frequency,
a location report frequency.

14. A method of transmitting or receiving data by a communications device in a wireless communications network, the method comprising:
establishing a connection for transmitting or receiving the data in a first cell of the wireless communications network, a geographic coverage region corresponding to the first cell comprising a plurality of sub-cell regions,
determining one of the plurality of sub-cell regions as a current sub-cell region in which the communications device is located based on mobility patterns of the communications device,
determining that the current sub-cell region has changed, and
in response to the determining that the current sub-cell region has changed, adapting based on a new current sub-cell region, at least one of
a measurement report reporting threshold, and
a measurement report frequency.

15. The method according to claim 14, wherein the first cell is associated with a first infrastructure equipment, the method comprising:
receiving an indication of the current sub-cell region transmitted by the first infrastructure equipment.

16. The method according to claim 14, further comprising:
receiving an indication of regions corresponding to the plurality of sub-cell regions, and
determining a current location of the communications device, wherein
determining the one of the sub-cell regions as the current sub-cell region in which the communications device is located is based on the current location and the indication of the regions corresponding to the plurality of sub-cell regions.

17. A method of operating an infrastructure equipment in a wireless communications network, the method comprising:
establishing a connection with a communications device for transmitting or receiving the data in a first cell of the wireless communications network, and
transmitting to the communications device a representation of a model trained using machine learning, the model for determining, based on the value of the one or more input parameters, that the communications device should perform a handover to establish a connection in a second cell,
receiving a handover message that includes an indication of an identify of each of a plurality of cells including the second cell, the identity of each of the plurality of cells being determined using the model.

18. The method according to claim 14, wherein the mobility patterns are predicted mobility patterns.

19. The method according to claim 14, wherein the mobility patterns are historical mobility patterns.

* * * * *